United States Patent
Hendry et al.

(10) Patent No.: US 9,998,765 B2
(45) Date of Patent: Jun. 12, 2018

(54) TRANSPORT STREAM FOR CARRIAGE OF VIDEO CODING EXTENSIONS

(71) Applicant: QUALCOMM Incorporated, San Diego, CA (US)

(72) Inventors: Fnu Hendry, Poway, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 14/800,480

(22) Filed: Jul. 15, 2015

(65) Prior Publication Data

US 2016/0021398 A1    Jan. 21, 2016

Related U.S. Application Data

(60) Provisional application No. 62/025,432, filed on Jul. 16, 2014.

(51) Int. Cl.
*H04N 7/12* (2006.01)
*H04N 19/70* (2014.01)
(Continued)

(52) U.S. Cl.
CPC ............ *H04N 19/70* (2014.11); *H04N 19/12* (2014.11); *H04N 19/146* (2014.11);
(Continued)

(58) Field of Classification Search
IPC ..................................................... H04N 19/70
See application file for complete search history.

(56) References Cited

U.S. PATENT DOCUMENTS

| 6,414,991 | B1 | 7/2002 | Yagasaki et al. |
| 2013/0266077 | A1 | 10/2013 | Boyce et al. |

(Continued)

FOREIGN PATENT DOCUMENTS

| CA | 2890508 A1 | 5/2014 |
| WO | 2014050597 | 4/2014 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Tracy Y Li
(74) *Attorney, Agent, or Firm* — Shumaker & Sieffert, P.A.

(57) ABSTRACT

A video processing device may obtain, from a descriptor for a program comprising one or more elementary streams, a plurality of profile, tier, level (PTL) syntax element sets. Each respective PTL syntax element set of the plurality of PTL syntax element sets comprises syntax elements may specify respective PTL information. The video processing device obtains, from the descriptor for the program, a plurality of operation point syntax element sets. Each respective operation point syntax element set of the plurality of operation point syntax element sets may specify a respective operation point of a plurality of operation points. The video processing device may determine, for each respective layer of respective operation point specified by respective operation point syntax element sets, based on a respective syntax element in the respective operation point syntax element set, which of the PTL syntax element sets specifies the PTL information assigned to the respective layer.

31 Claims, 5 Drawing Sheets

(51) Int. Cl.

| | |
|---|---|
| *H04N 19/12* | (2014.01) |
| *H04N 19/146* | (2014.01) |
| *H04N 19/184* | (2014.01) |
| *H04N 19/42* | (2014.01) |
| *H04N 21/236* | (2011.01) |
| *H04N 21/4402* | (2011.01) |
| *H04N 19/31* | (2014.01) |
| *H04N 19/187* | (2014.01) |
| *H04N 21/2343* | (2011.01) |

(52) U.S. Cl.
CPC ......... *H04N 19/184* (2014.11); *H04N 19/187* (2014.11); *H04N 19/31* (2014.11); *H04N 19/42* (2014.11); *H04N 21/236* (2013.01); *H04N 21/440281* (2013.01); *H04N 21/234381* (2013.01)

(56) References Cited

U.S. PATENT DOCUMENTS

| | | | | |
|---|---|---|---|---|
| 2013/0291040 | A1* | 10/2013 | Rhyu | H04N 21/4622 725/109 |
| 2014/0192859 | A1* | 7/2014 | Haque | H04N 19/597 375/240.02 |
| 2014/0301440 | A1 | 10/2014 | Narasimhan et al. | |
| 2014/0301463 | A1* | 10/2014 | Rusanovskyy | H04N 19/52 375/240.14 |
| 2015/0195578 | A1 | 7/2015 | Chen et al. | |
| 2016/0021375 | A1 | 1/2016 | Hendry et al. | |
| 2016/0286239 | A1* | 9/2016 | Sato | H04N 19/70 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Response to Written Opinion dated Sep. 16, 2015, from International Application No. PCT/US2015/040717, filed on Feb. 23, 2016, 6 pp.

"Information technology—Generic coding of moving pictures and associated audio information: Systems," International Standard, ISO/IEC 13818-1, Second edition Dec. 1, 2000, 174 pp.

Tech, et al., "3D-HEVC Draft Text 1," (Joint Collaborative Team on Video Coding of ISO/IEC JTC1/SC29/WG11 and ITU-T SG.16); Document: JCT3V-E1001_v3, Jul. 27-Aug. 2, 2013, 89 pp.

Tech, et al., "MV-HEVC Draft Text 5," (Joint Collaborative Team on Video Coding of ISO/IEC JTC1/SC29/WG11 and ITU-T SG.16); Document: JCT3V-E1004_v6, Jul. 27-Aug. 2, 2013, 65 pp.

Wang, et al., "High Efficiency Video Coding (HEVC) Defect Report," (Joint Collaborative Team on Video Coding of ISO/IEC JTC1/SC29/WG11 and ITU-T SG.16); Document: JCTVC-N1003_v1, Jul. 25-Aug. 2, 2013, 311 pp.

Flynn, et al., "High Efficiency Video Coding (HEVC) Range Extensions text specification: Draft 4," (Joint Collaborative Team on Video Coding of ISO/IEC JTC1/SC29/WG11 and ITU-T SG16); Document: JCTVC-N1005_v1, Apr. 18-26, 2013, 322 pp.

Chen, et al., "High efficiency video coding (HEVC) scalable extension draft 3," (Joint Collaborative Team on Video Coding of ISO/IEC JTC1/SC29/WG11 and ITU-T SG16); Document: JCTVC-N1008_v3, Jul. 25-Aug. 2, 2013, 68 pp.

ITU-T H.222.0, Series H: Audiovisual and Multimedia Systems, Infrastructure of audiovisual services—Transmission multiplexing and synchronization, Information technology—Generic coding of moving pictures and associated audio information: systems, The International Telecommunication Union. Feb. 2000, 171 pp.

Wang, et al., "AHG9: On video parameter set," JCT-VC Meeting; MPEG Meeting; Oct. 10-19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K0125, XP030113007, 7 pp.

International Search Report and Written Opinion from International Application No. PCT/US2015/040717, dated Sep. 16, 2015, 12 pp.

Sjoberg R., et al., "High-Level Syntax for Bitstream Extraction", 7. JCT-VC Meeting; 98. MPEG Meeting; Nov. 21-30, 2011; Geneva; (Joint Collaborative Team on Video Coding of ISO/IEC JTC1/SC29/WG11 and ITU-T SG.16); URL: http://wftp3.itu.int/av-arch/jctvc-site/,No. JCTVC-G607, Nov. 8, 2011 (Nov. 8, 2011), XP030110591, the whole document.

Sullivan, et al., "Overview of the High Efficiency Video Coding (HEVC) Standard," IEE Transactions on Circuits and Systems for Video Technology, vol. 22, No. 12, Dec. 2012, pp. 1649-1668.

Gerard et al. "Comments on Text of ISO/IEC 13818-1:2013 / PDAM 7—Carriage of Layered HEVC," MPEG Meeting; Jul. 7-11, 2014; Sapporo; (Motion Picture Expert Group or ISO/IEC JTC1/SC29/WG11),, No. m34380, Jul. 2014; XP030062753.

Schierl, et al., "Scalable video coding over RTP and MPEG-2 transport stream in broadcast and IPTV channels", IEEE Wireless Communications, IEEE service Center, Piscataway, NJ, US, Val. 16, No. 5, Oct. 2009, pp. 64-71, XP011284069, ISSN: 1536-1284, DOI: 10.1109/MWC.2009.5300304.

Hendry et al., "Comments on WD of carriage of layered HEVC over MPEG-2 Systems", MPEG Meeting; Mar. 31-Apr. 4, 2014; Valencia; (Motion Picture Expert Group or ISO/IEC JTC1/SC29/WG11), No. m33301, Mar. 27, 2014, XP030061753, 6 pp.

Second Written Opinion from International Application No. PCT/US2015/040717, dated Jul. 5, 2016, 7 pp.

Response to Second Written Opinion dated Jul. 5, 2016, from International Application No. PCT/US2015/040721, dated Sep. 2, 2016, 33 pp.

International Preliminary Report on Patentability from International Application No. PCT/US2015/040721, dated Sep. 28, 2016, 7 pp.

Flynn, et al., "High Efficiency Video Coding (HEVC) Range Extensions text specification: Draft 4," Apr. 18-26, 2013; (Joint

(56) References Cited

OTHER PUBLICATIONS

Collaborative Team on Video Coding (JCT-VC) of ITU-T SG 16 WP 3 and ISO/IEC JTC 1/SC/WG 11); document No. JCTVC-N1005_v1; 334 pp.

* cited by examiner

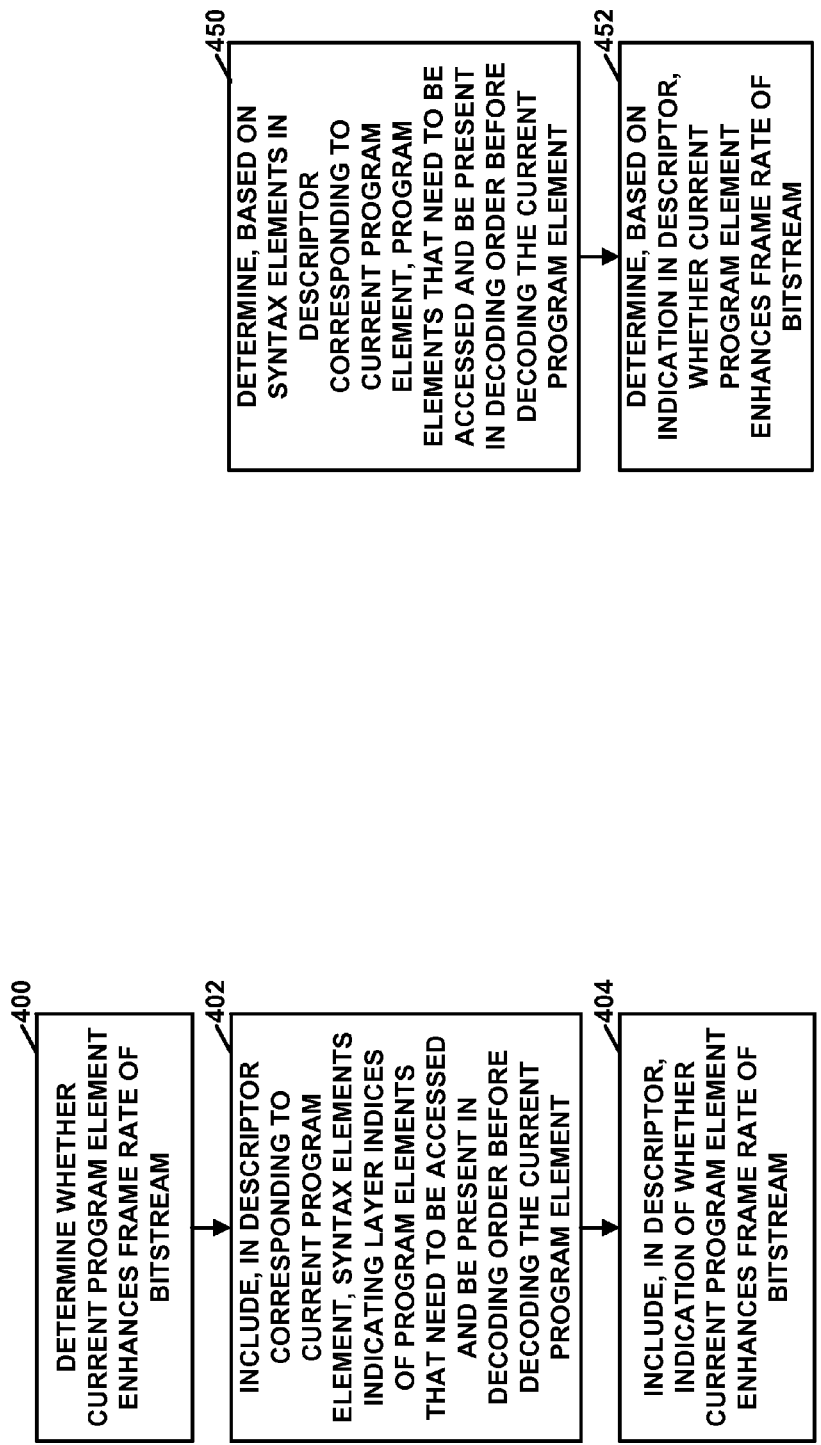

TRANSPORT STREAM FOR CARRIAGE OF VIDEO CODING EXTENSIONS

This application claims the benefit of U.S. Provisional Patent Application No. 62/025,432, filed Jul. 16, 2014, the entire content of which is incorporated by reference.

TECHNICAL FIELD

This disclosure relates to video processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

Techniques of this disclosure include techniques related to the MPEG-2 streams for carriage of multi-layer video data. For instance, particular techniques of this disclosure relate to MPEG-2 transport streams for carriage of High Efficiency Video Coding (HEVC) extensions, such as Multi-View HEVC (MV-HEVC), 3-dimensional HEVC (3D-HEVC), and Scalable HEVC (SHVC). In accordance with some techniques of this disclosure, a descriptor that includes syntax elements indicating layer indices of program elements that need to be present in decoding order before decoding a current program element also includes an indication of whether the current program element enhances a frame rate of a bitstream. In accordance with one or more additional techniques of this disclosure, a descriptor for a program includes syntax elements specifying sets of profile, tier, level (PTL) information and also includes syntax elements indicating which of the sets of PTL information apply to particular layers of operation points.

In one example, this disclosure describes a method of processing video data, the method comprising: obtaining, from a first descriptor for a program comprising one or more elementary streams, a plurality of PTL syntax element sets, each respective PTL syntax element set of the plurality of PTL syntax element sets comprising syntax elements specifying respective PTL information, the first descriptor being in a transport stream; obtaining, from the first descriptor or a second descriptor for the program, a plurality of operation point syntax element sets, wherein each respective operation point syntax element set of the plurality of operation point syntax element sets specifies a respective operation point of a plurality of operation points; and for each respective operation point syntax element set of the plurality of operation point syntax element sets, determining, for each respective layer of the respective operation point specified by the respective operation point syntax element set, based on a respective syntax element in the respective operation point syntax element set, which of the PTL syntax element sets specifies the PTL information assigned to the respective layer, the respective operation point having a plurality of layers.

In another example, this disclosure describes a method of processing video data, the method comprising: signaling, in a first descriptor for a program comprising one or more elementary streams, a plurality of PTL syntax element sets, each respective PTL syntax element set of the plurality of PTL syntax element sets comprising syntax elements specifying respective PTL information, the first descriptor being in a transport stream; and signaling, in the first descriptor or a second descriptor for the program, a plurality of operation point syntax element sets, wherein: each respective operation point syntax element set of the plurality of operation point syntax element sets specifies a respective operation point of the plurality of operation points, and for each respective layer of the respective operation point, the respective operation point syntax element includes a respective syntax element identifying a respective PTL syntax element set of the plurality of PTL syntax element sets specifying PTL information assigned to the respective layer of the respective operation point, the respective operation point having a plurality of layers.

In another example, this disclosure describes a device for processing video data, the device comprising: a data storage medium configured to store encoded video data, and one or more processors configured to: obtain, from a first descriptor for a program comprising one or more elementary streams comprising the encoded video data, a plurality of PTL syntax element sets, each respective PTL syntax element set of the plurality of PTL syntax element sets comprising syntax elements specifying respective PTL information, the first descriptor being in a transport stream; obtain, from the first descriptor or a second descriptor for the program, a plurality of operation point syntax element sets, wherein each respective operation point syntax element set of the plurality of operation point syntax element sets specifies a respective operation point of a plurality of operation points; and for each respective operation point syntax element set of the plurality of operation point syntax element sets, determine, for each respective layer of the respective operation point specified by the respective operation point syntax element set, based on a respective syntax element in the respective operation point syntax element set, which of the PTL syntax element sets specifies the PTL information assigned to the respective layer, the respective operation point having a plurality of layers.

In another example, this disclosure describes a device for processing video data, the device comprising: a data storage medium configured to store encoded video data, and one or more processors configured to: signal, in a first descriptor for a program comprising one or more elementary streams comprising the encoded video data, a plurality of PTL syntax element sets, each respective PTL syntax element set of the plurality of PTL syntax element sets comprising syntax elements specifying respective PTL information, the first descriptor being in a transport stream; and signal, in the first descriptor or a second descriptor for the program, a plurality of operation point syntax element sets, wherein: each respective operation point syntax element set of the plurality of operation point syntax element sets specifies a respective operation point of the plurality of operation points, and for each respective layer of the respective operation point, the respective operation point syntax element includes a respective syntax element identifying a respective PTL syntax element set of the plurality of PTL syntax element sets specifying PTL information assigned to the respective layer of the respective operation point, the respective operation point having a plurality of layers.

In another example, this disclosure describes a device for processing video data, the device comprising: means for obtaining, from a first descriptor for a program comprising one or more elementary streams, a plurality of PTL syntax element sets, each respective PTL syntax element set of the plurality of PTL syntax element sets comprising syntax elements specifying respective PTL information, the first descriptor being in a transport stream; means for obtaining, from the first descriptor or a second descriptor for the program, a plurality of operation point syntax element sets, wherein each respective operation point syntax element set of the plurality of operation point syntax element sets specifies a respective operation point of a plurality of operation points; and for each respective operation point syntax element set of the plurality of operation point syntax element sets, means for determining, for each respective layer of the respective operation point specified by the respective operation point syntax element set, based on a respective syntax element in the respective operation point syntax element set, which of the PTL syntax element sets specifies the PTL information assigned to the respective layer, the respective operation point having a plurality of layers.

In another example, this disclosure describes a device for processing video data, the device comprising: means for signaling, in a first descriptor for a program comprising one or more elementary streams, a plurality of PTL syntax element sets, each respective PTL syntax element set of the plurality of PTL syntax element sets comprising syntax elements specifying respective PTL information, the first descriptor being in a transport stream; and means for signaling, in the first descriptor or a second descriptor for the program, a plurality of operation point syntax element sets, wherein: each respective operation point syntax element set of the plurality of operation point syntax element sets specifies a respective operation point of the plurality of operation points, and for each respective layer of the respective operation point, the respective operation point syntax element includes a respective syntax element identifying a respective PTL syntax element set of the plurality of PTL syntax element sets specifying PTL information assigned to the respective layer of the respective operation point, the respective operation point having a plurality of layers.

In another example, this disclosure describes a computer-readable data storage medium having instructions stored thereon that, when executed, cause one or more processors of a video processing device to: obtain, from a first descriptor for a program comprising one or more elementary streams, a plurality of PTL syntax element sets, each respective PTL syntax element set of the plurality of PTL syntax element sets comprising syntax elements specifying respective PTL information, the first descriptor being in a transport stream; obtain, from the first descriptor or a second descriptor for the program, a plurality of operation point syntax element sets, wherein each respective operation point syntax element set of the plurality of operation point syntax element sets specifies a respective operation point of a plurality of operation points; and for each respective operation point syntax element set of the plurality of operation point syntax element sets, determine, for each respective layer of the respective operation point specified by the respective operation point syntax element set, based on a respective syntax element in the respective operation point syntax element set, which of the PTL syntax element sets specifies the PTL information assigned to the respective layer, the respective operation point having a plurality of layers.

In another example, this disclosure describes a computer-readable data storage medium having instructions stored thereon that, when executed, cause one or more processors of a video processing device to: signal, in a first descriptor for a program comprising one or more elementary streams, a plurality of PTL syntax element sets, each respective PTL syntax element set of the plurality of PTL syntax element sets comprising syntax elements specifying respective PTL information, the first descriptor being in a transport stream; and signal, in the first descriptor or a second descriptor for the program, a plurality of operation point syntax element sets, wherein: each respective operation point syntax element set of the plurality of operation point syntax element sets specifies a respective operation point of the plurality of operation points, and for each respective layer of the respective operation point, the respective operation point syntax element includes a respective syntax element identifying a respective PTL syntax element set of the plurality of PTL syntax element sets specifying PTL information assigned to the respective layer of the respective operation point, the respective operation point having a plurality of layers.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 4A is a flowchart illustrating a first example operation to process video data, in accordance with a technique of this disclosure.

FIG. 4B is a flowchart illustrating a second example operation to process video data, in accordance with a technique of this disclosure.

DETAILED DESCRIPTION

Figure 1:
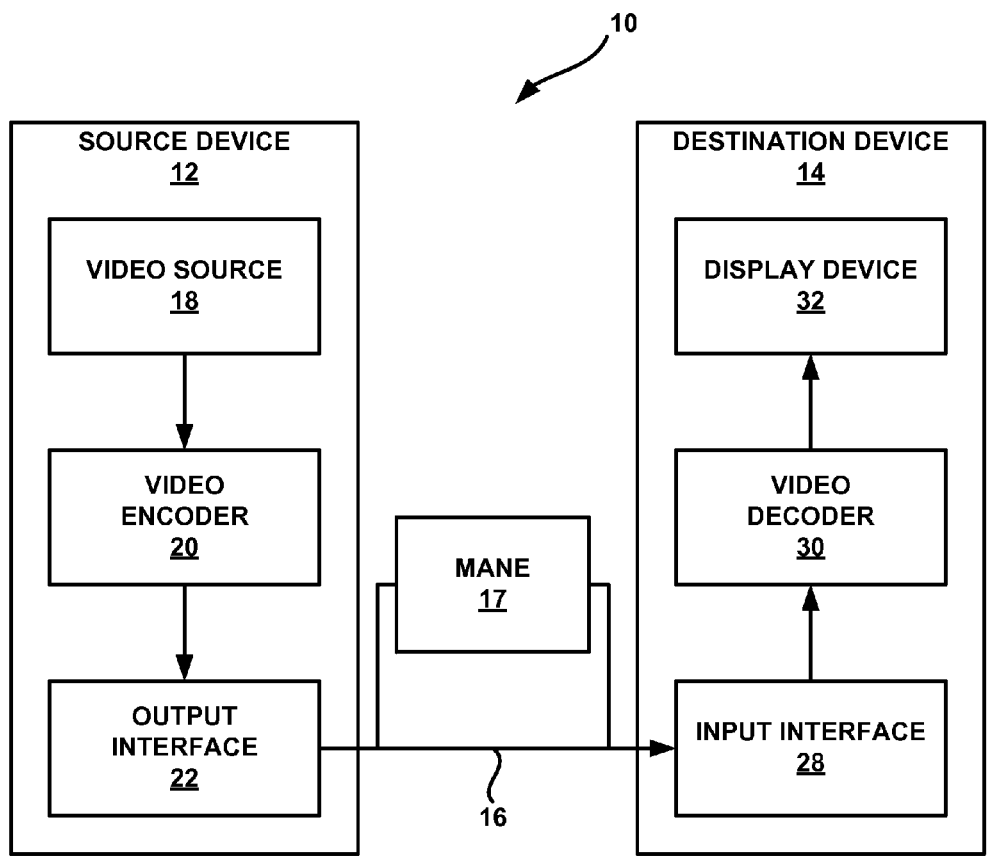
FIG. 1 is a block diagram illustrating an example video coding system that may utilize the techniques described in this disclosure.

High Efficiency Video Coding (HEVC) is a recently standardized video coding standard. Multi-layer HEVC is a term referring to extensions of HEVC supporting multiple layers. Multi-view HEVC (MV-HEVC), 3-dimensional HEVC (3D-HEVC), and Scalable HEVC (SHVC) are example types of multi-layer HEVC. In MV-HEVC and 3D-HEVC, different layers may correspond to different views. SHVC provides for a base layer and enhancement layers. The enhancement layers may provide enhancements to the frame rate or picture quality of the base layer.

Some pictures within a layer may be decoded without reference to other pictures within the same layer. Thus, network abstraction layer (NAL) units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

The MPEG-2 Systems specification describes how compressed multimedia (video and audio) data streams may be multiplexed together with other data to form a single data stream suitable for digital transmission or storage. HEVC and multi-layer HEVC are example types of video data that may be multiplexed to form a data stream in the MPEG-2 Systems specification. The MPEG-2 Systems specification defines the concepts of a program stream and a transport stream. Program streams are biased for the storage and display of a single program from a digital storage service. In general, a program stream is intended for use in error-free environments. In contrast, transport streams are intended for the simultaneous delivery of multiple programs over potentially error-prone channels. Program streams and transport streams include packetized elementary stream (PES) packets. The PES packets of program streams and transport streams belong to one or more elementary streams. An elementary stream is a single, digitally coded (possibly HEVC- or multi-layer HEVC-compressed) component of a program. For example, the coded video or audio part of the program can be an elementary stream.

A transport stream may include one or more descriptors that convey further information about a program or elementary streams of a program. For instance, descriptors may include video encoding parameters, audio encoding parameters, language identification information, pan-and-scan information, conditional access details, copyright information, and so on. A broadcaster or other user may define additional private descriptors, if required. In video related component elementary streams, the descriptors may include one or more hierarchy descriptors. The hierarchy descriptor provides information identifying the program elements containing components of hierarchically-coded video, audio, and private streams. The private streams may include metadata, such as a stream of program specific information. In general, a program element is one of the data or elementary streams included in a program (i.e., a component elementary stream of the program). In MPEG-2 transport streams, program elements are usually packetized. In MPEG-2 program streams, the program elements are not packetized.

The descriptors are separate from the encoded video data. Thus, a device, such as a Media Aware Network Element (MANE), may be able to use a descriptor to perform various functions on transport streams and program streams without decoding or otherwise analyzing encoded video data. For instance, if the video data is encoded using HEVC, the device does not need to be configured to decode HEVC-encoded video data in order to use the descriptor to perform particular functions on transport or program streams. For instance, the device may be able to use the descriptors as part of a process to determine whether to forward particular program elements to a destination device.

Each respective temporal sub-layer of each respective layer of a program may correspond to a different program component (e.g., elementary stream) of the program. As indicated above, the descriptors may include hierarchy descriptors. Each respective hierarchy descriptor provides information regarding a corresponding program component, and hence a respective temporal sub-layer. For instance, a hierarchy descriptor may include a syntax element specifying an embedded temporal sub-layer needed to decode the temporal sub-layer corresponding to the hierarchy descriptor. Furthermore, the hierarchy descriptor may include syntax elements specifying whether the corresponding temporal sub-layer provides temporal scalability (e.g., increases the frame rate) relative to the embedded temporal sub-layer, provides spatial scalability (e.g., increases picture resolution) relative to the embedded temporal sub-layer, provides quality scalability (e.g., enhances signal-to-noise quality or fidelity) relative to the embedded temporal sub-layer, and so on. A hierarchy descriptor does not indicate whether decoding the corresponding temporal sub-layer is dependent on decoding program components corresponding to different layers.

In addition to the one or more hierarchy descriptors, the descriptors signaled in a MPEG-2 transport or program stream may include one or more hierarchy extension descriptors. Each hierarchy extension descriptor may provide additional information regarding a corresponding program component, and hence a respective temporal sub-layer. Unlike a hierarchy descriptor, a hierarchy extension descriptor may indicate which layers are required to be decoded to successfully decode the temporal sub-layer corresponding to the hierarchy extension descriptor.

A hierarchy extension descriptor does not identify which, if any, temporal sub-layer is needed to decode the temporal sub-layer corresponding to the hierarchy extension descriptor. In other words, a hierarchy extension descriptor cannot describe temporal dependency. Thus, hierarchy descriptors are used to describe only temporal dependency, whereas other types of dependency are described using hierarchy extension descriptors. As a result, interpretation of hierarchy extension descriptors is dependent on hierarchy descriptors. In other words, a device may not be able to fully determine which other program components are required to be decoded in order to decode the program component corresponding to a hierarchy extension descriptor. Thus, a hierarchy extension descriptor may not be used without the existence of a corresponding hierarchy descriptor.

Particular techniques of this disclosure may break the dependency of hierarchy extension descriptors on hierarchy descriptors. Thus, in accordance with a technique of this disclosure, a device may use a hierarchy extension descriptor without the existence of a corresponding hierarchy descriptor. For example, a computing device may determine whether a current program element enhances (e.g., increases) a frame rate of a bitstream. In this example, the computing device may include, in a descriptor corresponding to the current program element (e.g., a hierarchy extension descriptor), syntax elements indicating layer indices of program elements that need to be accessed and be present in decoding order, before decoding the current program element. The descriptor may be in a transport stream. In other examples, the descriptor is in a program stream or elsewhere. In this example, the computing device includes, in the descriptor corresponding to the current program element, an indication of whether the current program element enhances the frame rate of the bitstream.

In addition to hierarchy descriptors and hierarchy extension descriptors, the descriptors of a transport or program stream may include HEVC operation point descriptors and HEVC extension descriptors. An HEVC operation point descriptor includes information describing an operation point. An operation point is a subset of NAL units of a bitstream. An operation point may be defined by a set of layer identifiers and a maximum temporal identifier. In some instances, an operation point consists of each NAL unit of a bitstream belonging to one of the identified layers and having a temporal identifier less than or equal to the maximum temporal identifier.

Both HEVC operation point descriptors and HEVC extension descriptors include syntax elements indicating profile, tier, and level (PTL) information. In general, a "profile" of a video coding standard is a subset of the features and tools present in the video coding standard. In other words, a profile defines what coding tools may be used. For instance, for a video encoder, a profile may be a set of coding tools that the video encoder can use to generate coded bitstreams conforming to said profile. For a video decoder, a profile may mean the set of coding tools the video decoder must have in order to be able to decode bitstreams said to conform to the profile.

A level is a defined set of constraints on the values that may be taken by the syntax elements and variables of a video coding standard. A tier is a specified category of level constraints imposed on values of the syntax elements in the bitstream or values of variables, where the level constraints are nested within a tier and a decoder conforming to a certain tier and level would be capable of decoding all bitstreams conforming to the same tier or the lower tier of that level or any level below that level. Thus, a level of a tier is a specified set of constraints imposed on values of the syntax elements in the bitstream or variables used in decoding the bitstream.

As indicated above, both HEVC operation point descriptors and HEVC extension descriptors include syntax elements indicating PTL information. However, the signaling of PTL information in HEVC operation point descriptors and HEVC extension descriptors is not aligned with how PTL information is signaled at the codec level, e.g., in SHVC and MV-HEVC. For instance, at the codec level, each layer included in an operation point is assigned with its own PTL information. However, this is not the case in HEVC operation point descriptors and HEVC extension descriptors.

Additional techniques of this disclosure may align the signaling of PTL information in such descriptors with the signaling of PTL information at the codec level. For instance, particular techniques of this disclosure may specify, in a descriptor corresponding to a program (e.g., a HEVC extension descriptor), PTL information for each respective layer of a set of operation points of the program. In one example, a computing device signals, in a descriptor for a program comprising one or more elementary streams, a plurality of PTL syntax element sets. The descriptor may be in a transport stream. In this example, for each respective layer of each respective operation point of a plurality of operation points of the program, the computing device or another device may assign respective PTL information to the respective layer of the respective operation point. Furthermore, in this example, the computing device signals, in the descriptor for the program, a plurality of operation point syntax element sets. In this example, each respective operation point syntax element set of the plurality of operation point syntax element sets specifies a respective operation point of the plurality of operation points. In this example, for each respective layer of the respective operation point, the respective operation point syntax element includes a respective syntax element identifying a respective PTL syntax element set of the plurality of PTL syntax element sets specifying the respective PTL information assigned to the respective layer of the respective operation point.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, video conferencing equipment, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of values for syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as International Organization for Standardization (ISO)/IEC MPEG-4 Visual and ITU-T H.264 (also known as ISO/IEC MPEG-4 AVC), including its Scalable Video Coding (SVC) extension, Multiview Video Coding (MVC) extension, and MVC-based three-dimensional video (3DV) extension. In some instances, any bitstream conforming to the MVC-based 3DV extension of H.264/AVC always contains a sub-bitstream that is compliant to the MVC extension of H.264/AVC. Furthermore, video encoder 20 and video decoder 30 may operate according to a 3DV coding extension to H.264/AVC (i.e., AVC-based 3DV) that is currently under development. In other examples, video encoder 20 and video decoder 30 may operate according to International Telecommunication Union Telecommunication Standardization Sector (ITU-T) H.261, International Organization for Standardization (ISO)/International Electrotechnical Commission (IEC) Moving Picture Experts Group (MPEG)-1 Visual, ITU-T H.262 or ISO/IEC MPEG-2 Visual, and ITU-T H.264, ISO/IEC Visual. In other words, video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In other examples, video encoder 20 and video decoder 30 may operate according to the High Efficiency Video Coding (HEVC) developed by the Joint Collaboration Team on Video Coding (JCT-VC) of ITU-T Video Coding Experts Group (VCEG) and ISO/IEC Motion Picture Experts Group (MPEG). HEVC may be referred to as "Rec. ITU-T H.265|ISO/IEC 23008-2." An HEVC draft specification, referred to as HEVC WD hereinafter, is available from http://phenix.int-evey.fr/jct/doc_end_user/documents/14_Vienna/wg11/JCTVC-N1003-v1.zip. A version of the HEVC, referred to as "HEVC Version 1" hereinafter, is available from https://www.itu.int/rec/dologin_pub.asp?lang=e&id=T-REC-H.265-201304-S!!PDF-E&type=items. A scalable extension to HEVC, named SHVC, is also being developed by the JCT-VC. A recent Working Draft (WD) of SHVC and referred to as SHVC WD3 hereinafter, is available from http://phenix.it-sudparis.eu/jct/doc_end_user/documents/14_Vienna/wg11/JCTVC-N1008-v3.zip. A recent working draft (WD) of the range extension of HEVC, is available from http://phenix.int-evry.fr/jct/doc_end_user/documents/14_Vienna/wg11/JCTVC-N1005-v3.zip.

Furthermore, video encoder 20 and video decoder 30 may operate according to scalable video coding, multi-view coding, and 3DV extensions for HEVC that are currently under development. The scalable video coding extension of HEVC may be referred to as SHVC. The multiview extension to HEVC, namely MV-HEVC, is also being developed by the JCT-3V. A recent Working Draft (WD) of MV-HEVC, referred to as MV-HEVC WD5 hereinafter, is available from http://phenix.it-sudparis.eu/jct2/doc_end_user/documents/5_Vienna/wg11/JCT3V-E1004-v6.zip. The 3DV extension of HEVC may be referred to as HEVC-based 3DV or 3D-HEVC. A recent working draft (WD) of the 3D extension of HEVC, namely 3D-HEVC is available from http://phenix.int-evry.fr/jct2/doc_end_user/documents/5_Vienna/wg11/JCT3V-E1001-v3.zip.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. In this disclosure, the phrase "based on" may indicate "based at least in part on." If video encoder 20 uses inter prediction to generate the predictive blocks of a PU, video encoder 20 may generate the predictive blocks of the PU based on decoded samples of one or more pictures other than the picture associated with the PU.

To support inter prediction, video encoder 20 may generate one or more reference picture lists. These reference picture lists may be referred to as RefPicList0 and RefPicList1. In some examples, video encoder 20 may generate different reference picture lists for different pictures or different slices of pictures. Hence, different PUs of different pictures and/or slices may be associated with different versions of RefPicList0 and RefPicList1.

Furthermore, when video encoder 20 uses inter prediction to generate a predictive block of a PU, the video encoder may signal motion information for the PU. The motion information may include a reference index for the PU and a motion vector for the PU. The reference index for the PU may indicate a position, within one of the reference picture lists associated with the PU, of a reference picture. The motion vector for the PU may indicate a spatial displacement between a prediction block of the PU and a reference location in the reference picture. Video encoder 20 may use samples of the reference picture associated with the reference location to generate a predictive block for the PU. Because the PU may be associated with two reference pictures, the PU may have two reference indexes and two motion vectors. Hence, a PU may have a RefPicList0 reference index and a RefPicList1 reference index. The PU's RefPicList0 reference index indicates a reference picture in the PU's version of RefPicList0. The PU's RefPicList1 reference index indicates a reference picture in the PU's version of RefPicList1. Similarly, the PU may have a RefPicList0 motion vector and a RefPicList1 motion vector. The PU's RefPicList0 motion vector may indicate a reference location in a reference picture in the PU's version of RefPicList0. The PU's RefPicList1 motion vector may indicate a reference location in a reference picture in the PU's version of RefPicList1.

Video encoder 20 may signal a PU's reference indexes and motion vectors in a bitstream. In other words, video encoder 20 may include, in the bitstream, data indicating the PU's reference indexes and motion vectors. Video decoder 30 may reconstruct the PU's versions of RefPicList0 and/or RefPicList1 and may use the PU's reference indexes and motion vectors to determine one or more predictive blocks for the PU. Video decoder 30 may use the predictive blocks for the PU, along with residual data, to decode samples.

After video encoder 20 generates a predictive block for a PU of a CU, video encoder 20 may generate a residual block for the CU. Each sample of a residual block of a CU may indicate a difference between a sample in one of a predictive block of a PU of the CU and a corresponding sample in one of the coding blocks of the CU. For example, video encoder 20 may generate predictive luma blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb, and Cr residual blocks) of a CU into one or more transform blocks (e.g., luma, Cb, and Cr transform blocks). A transform block may be a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. For example, video encoder 20 may apply one or transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate an RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units. NAL units that contain parameter sets (e.g., VPSs, SPSs, PPSs, etc.) may be referred to as parameter set NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. In the context of multi-view coding, the term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. In some examples, a view component may be a texture view component (i.e., a texture picture) or a depth view component (i.e., a depth picture).

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

For instance, NAL units may include headers (i.e., NAL unit headers) and payloads (e.g., RBSPs). The NAL unit headers may include nuh_reserved_zero_6 bits syntax elements. NAL units having nuh_layer_id syntax elements, which may also be named nuh_reserved_zero_6 bit syntax elements, specifying different values belong to different "layers" of a bitstream. Thus, in multi-view coding, 3DV, or SVC, the nuh_layer_id syntax element of the NAL unit specifies a layer identifier (i.e., a layer ID) of the NAL unit. The nuh_layer_id syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_layer_id syntax element may have a non-zero value. In multi-view coding and 3DV coding, different layers of a bitstream may correspond to different views. In SVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

NAL units may include temporal_id syntax elements. The temporal_id syntax element of a NAL unit specifies a temporal identifier of the NAL unit. The temporal identifier of a NAL unit identifies a sub-layer with which the NAL unit is associated. Thus, each sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

A bitstream may be associated with a plurality of operation points. Each operation point of a bitstream is associated with a set of layer identifiers (i.e., a set of nuh_reserved_zero_6 bits values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. An operation point representation is a bitstream subset that is associated with an operation point. The operation point representation may include each NAL unit that is associated with the operation point. In some examples, the operation point representation does not include VCL NAL units that are not associated with the operation point.

A media aware network element (MANE) 17 may apply bitstream thinning to an HEVC bitstream that is encoded with multiple sub-layers. MANE 17 may comprise various types of computing devices, each of which may comprise one or more processors and data storage media. At any point in the bitstream, MANE 17 can start removing NAL units of higher sub-layers (i.e., sub-layers associated with higher temporal identifiers) based on the fact that the pictures in the lower sub-layers (i.e., sub-layers associated with lower temporal identifiers) are still decodable because the decoding process for the pictures in the lower sub-layers does not depend on the NAL units of the higher sub-layers. The action of removing all NAL units with temporal identifiers higher than a certain value can be referred to as temporal down-switching. Temporal down-switching may always be possible.

The term "temporal up-switching" may refer to the action of starting to forward NAL units of a certain sub-layer that has not been forwarded up until that point. Temporal up-switching may only be possible if none of the pictures in the layer that is switched to depend on any picture in the same sub-layer prior to the point in the bitstream at which the switch was performed. Thus, the term "temporal sub-layer switching point" may refer to a picture that has no dependency on any other picture that is in the same sub-layer as the picture and that precedes the picture in decoding order.

HEVC and other video coding standards specify profiles, tiers, and levels. Profiles, tiers, and levels specify restrictions on bitstreams and hence limits on the capabilities needed to decode the bitstreams. Profiles, tiers, and levels may also be used to indicate interoperability points between individual decoder implementations. Each profile specifies a subset of algorithmic features and tools present in a video coding standard. Video encoders are not required to make use of all features supported in a profile. Each level of a tier may specify a set of limits on the values that syntax elements and variables may have. The same set of tier and level definitions may be used with all profiles, but individual implementations may support a different tier and within a tier a different level for each supported profile. For any given profile, a level of a tier may generally correspond to a particular decoder processing load and memory capability. Capabilities of video decoders may be specified in terms of the ability to decode video streams conforming to the constraints of particular profiles, tiers, and levels. For each such profile, the tier and level supported for that profile may also be expressed. Some video decoders may not be able to decode particular profiles, tiers, or levels.

In HEVC, profiles, tiers, and levels may be signaled by the syntax structure profile_tier_level( ) syntax structure. The profile_tier_level( ) syntax structure may be included in a VPS and/or a SPS. The profile_tier_level( ) syntax structure may include a general_profile_idc syntax element, a general_tier_flag syntax element, and a general_level_idc syntax element. The general_profile_idc syntax element may indicate a profile to which a coded video sequence (CVS) conforms. The general_tier_flag syntax element may indicate a tier context for interpretation of the general_level_idc syntax element. The general_level_idc syntax element may indicate a level to which a CVS conforms. Other values for these syntax elements may be reserved.

Capabilities of video decoders may be specified in terms of the ability to decode video streams conforming to the constraints of profiles, tiers, and levels. For each such profile, the tier and level supported for that profile may also be expressed. In some examples, video decoders do not infer that a reserved value of the general_profile_idc syntax element between the values specified in HEVC indicates intermediate capabilities between the specified profiles. However, video decoders may infer that a reserved value of the general_level_idc syntax element associated with a particular value of the general_tier_flag syntax element between the values specified in HEVC indicates intermediate capabilities between the specified levels of the tier.

The MPEG-2 Systems specification describes how compressed multimedia (video and audio) data streams may be multiplexed together with other data to form a single data stream suitable for digital transmission or storage. A specification of MPEG-2 TS is the ITU-T recommendation H.222.0, 2012 June version (hereinafter, "H.222.0"), wherein the support of AVC and AVC extensions are provided. The amendment of MPEG-2 TS for HEVC has been developed. The latest document is "Text of ISO/IEC 13818-1: 2013/Final Draft Amendment 3—Transport of HEVC video over MPEG-2 Systems," in MPEG document w13656, July 2013 (hereinafter, "FDAM 3"). Recently, an amendment of MPEG-2 TS for carriage of layered HEVC has been started. The latest document is "Text of ISO/IEC 13818-1:2013/Study of PDAM 7—Carriage of Layered HEVC," in MPEG document w14562, July 2014 (hereinafter, "Study of PDAM 7").

In the MPEG-2 Systems specification, an elementary stream is a single, digitally coded (possibly MPEG-compressed) component of a program. For example, the coded video or audio part of the program can be an elementary stream. An elementary stream is firstly converted into a packetized elementary stream (PES) before multiplexed into a program stream or transport stream. Within the same program, a stream_id is used to distinguish the PES-packets belonging to one elementary stream from another.

In the MPEG-2 Systems specification, program streams and transport streams are two alternative multiplexes targeting different applications. Program streams are biased for the storage and display of a single program from a digital storage service. Program streams are primarily intended for use in error-free environments because program streams may be susceptible to errors.

A program stream comprises the elementary streams belonging to the program stream and typically contains variable length packets. In a program stream, PES-packets that are derived from the contributing elementary streams are organized into 'packs.' A pack comprises a pack-header, an optional system header and any number of PES-packets taken from any of the contributing elementary streams, in any order. The system header contains a summary of the characteristics of the program stream such as: its maximum data rate; the number of contributing video and audio elementary streams; further timing information. A decoder may use the information contained in a system header to determine whether the decoder is capable of decoding the program stream or not.

Transport streams are primarily intended for the simultaneous delivery of a number of programs over potentially error-prone channels. A transport stream is a multiplex devised for multi-program applications such as broadcasting, so that a single transport stream can accommodate many independent programs. A transport stream comprises a succession of transport packets. In some instances, each of the transport packets is 188 bytes long. The use of short, fixed length packets means that transport streams are not as susceptible to errors as program streams. Further, each 188-byte-long transport packet may be given additional error protection by processing the transport packet through a standard error protection process, such as Reed-Solomon encoding. The improved error resilience of the transport stream means a transport packet has a better chance of surviving the error-prone channels, such as channels found in a broadcast environment. It might seem that the transport stream is clearly the better of the two multiplexes with its increased error resilience and ability to carry many simultaneous programs. However, the transport stream is a more sophisticated multiplex than the program stream and is consequently more difficult to create and to demultiplex.

The first byte of a transport packet is a synchronization byte which, in some instances, is 0x47. A single transport stream may carry many different programs, each comprising many packetized elementary streams. A Packet Identifier (PID) field is used to distinguish transport packets containing the data of one elementary stream from those carrying the data of other elementary streams. In some instances, the PID is 13 bits. It is the responsibility of the multiplexer to ensure that each elementary stream is awarded a unique PID value. The last byte of a transport packet is a continuity count field. The continuity count field is incremented between successive transport packets belonging to the same elementary stream. This may enable a decoder to detect the loss or gain of a transport packet and potentially conceal errors that might otherwise result from such an event.

Although it is clear based on a PID value which elementary stream a transport packet belongs to, there is a need for the decoder to know which elementary streams belong to which program. Accordingly, a transport stream comprises program specific information (PSI) to explicitly specify relationships between the programs and the component elementary streams.

The program specific information may include one or more program map tables (PMTs). Each program carried in a transport stream has an associated Program Map Table. The PMT gives details about the program and the elementary streams that comprise the program. For example, there is a program with number 3 and the program contains video with PID 33, English audio with PID 57, and Chinese audio with PID 60. A PMT may include details regarding more than one program.

The basic program map table may include some of the many descriptors specified within the MPEG-2 systems specification. Such descriptors convey further information about a program or its component elementary streams. The descriptors may include video encoding parameters, audio encoding parameters, language identification, pan-and-scan information, conditional access details, copyright information and so on. A broadcaster or other user may define additional private descriptors if required. As discussed in detail elsewhere in this disclosure, in the video related component elementary streams, there may also be a hierarchy descriptor, which provides information to identify the program elements containing components of hierarchically-coded video, audio, and private streams.

In addition to the PMT, the PSI may include a Program Stream Map (PSM). The PSM provides a description of elementary streams in a program stream and the elementary streams' relationships to one another. When carried in a transport stream, the program stream map is not be modified. The PSM is present as a PES packet when the stream_id value is 0xBC.

Furthermore, the PSI may include a program association table (PAT). The program association table includes a complete list of all the programs available in a transport stream. In some examples, the PAT always has the PID value 0. Each program is listed along with the PID value of the transport packets that contain the program map table of the program. The PSI may also include a network information table (NIT) and a conditional access table (CAT). The program number zero, specified in the PAT, points to the NIT. The NIT is optional and when present, provides information about a physical network carrying the transport stream, such as channel frequencies, satellite transponder details, modulation characteristics, service originator, service name and details of alternative networks available. If any elementary streams within a transport stream are scrambled, a CAT must be present. The CAT provides details of the scrambling system(s) in use and provides the PID values of transport packets that contain the conditional access management and entitlement information. The format of this information is not specified within the MPEG-2 Systems specification.

In the MPEG-2 transport stream, a hierarchy descriptor is designed to signal the hierarchy of the sub-bitstreams in different elementary streams. The hierarchy descriptor provides information to identify the program elements containing components of hierarchically-coded video, audio, and private streams. (See Table 2-49 below)

TABLE 2-49

Hierarchy descriptor

| Syntax | No. of bits | Mnemonic |
| --- | --- | --- |
| hierarchy_descriptor( ) { | | |
|     descriptor_tag | 8 | uimsbf |
|     descriptor_length | 8 | uimsbf |
|     Reserved | 1 | bslbf |
|     temporal_scalability_flag | 1 | bslbf |
|     spatial_scalability_flag | 1 | bslbf |
|     quality_scalability_flag | 1 | bslbf |
|     hierarchy_type | 4 | uimsbf |
|     Reserved | 2 | bslbf |
|     hierarchy_layer_index | 6 | uimsbf |
|     tref_present_flag | 1 | bslbf |
|     reserved | 1 | bslbf |
|     hierarchy_embedded_layer_index | 6 | uimsbf |
|     reserved | 2 | bslbf |
|     hierarchy_channel | 6 | uimsbf |
| } | | |

In Table 2-49, temporal_scalability_flag is a 1-bit flag, which when set to '0' indicates that the associated program element enhances the frame rate of the bit-stream resulting from the program element referenced by the hierarchy_embedded_layer_index. The value of '1' for this flag is reserved.

spatial_scalability_flag is a 1-bit flag, which when set to '0' indicates that the associated program element enhances the spatial resolution of the bit-stream resulting from the program element referenced by the hierarchy_embedded_layer_index. The value of '1' for this flag is reserved.

quality_scalability_flag is a 1-bit flag, which when set to '0' indicates that the associated program element enhances the signal-to-noise ratio (SNR) quality or fidelity of the bit-stream resulting from the program element referenced by the hierarchy_embedded_layer_index. The value of '1' for this flag is reserved.

hierarchy_type indicates a hierarchy_type. The hierarchical relation between the associated hierarchy layer and its hierarchy embedded layer is defined in Table 2-50, which is presented below. If scalability applies in more than one dimension, hierarchy_type shall be set to the value of '8' ("Combined Scalability"), and the flags temporal_scalability_flag, spatial_scalability_flag and quality_scalability_flag shall be set accordingly. For MVC video sub-bitstreams, hierarchy_type shall be set to the value of '9' ("MVC video sub-bitstream") and the flags temporal_scalability_flag, spatial_scalability_flag and quality_scalability_flag shall be set to '1'. For MVC base view sub-bitstreams, hierarchy_type shall be set to the value of '15' and the flags temporal_scalability_flag, spatial_scalability_flag and quality_scalability_flag shall be set to '1'.

hierarchy_layer_index is a 6-bit field that defines a unique index of the associated program element in a table of coding layer hierarchies. Indices shall be unique within a single program definition. For video sub-bitstreams of AVC video streams conforming to one or more profiles defined in Annex G of Rec. ITU-T H.264|ISO/IEC 14496-10, this is the program element index, which is assigned in a way that the bitstream order will be correct if associated SVC dependency representations of the video sub-bitstreams of the same access unit are re-assembled in increasing order of hierarchy_layer_index. For MVC video sub-bitstreams of AVC video streams conforming to one or more profiles defined in Annex H of Rec. ITU-T H.264|ISO/IEC 14496-10, this is the program element index, which is assigned in a way that the bitstream order will be correct if associated MVC view-component subsets of the MVC video sub-bitstreams of the same access unit are re-assembled in increasing order of hierarchy_layer_index.

tref_present_flag is a 1-bit flag, which when set to '0' indicates the TREF field may be present in the PES packet headers in the associated elementary stream. The value of '1' for this flag is reserved.

hierarchy_embedded_layer_index is a 6-bit field defining the hierarchy_layer_index of the program element that needs to be accessed and be present in decoding order before decoding of the elementary stream associated with this hierarchy_descriptor. hierarchy_embedded_layer_index is undefined if the hierarchy_type value is 15.

hierarchy_channel is a 6-bit field that indicates the intended channel number for the associated program element in an ordered set of transmission channels. The most robust transmission channel is defined by the lowest value of this field with respect to the overall transmission hierarchy definition. A given hierarchy_channel may at the same time be assigned to several program elements.

TABLE 2-50

Hierarchy_type field values

| Value | Description |
|---|---|
| 0 | Reserved |
| 1 | Spatial Scalability |
| 2 | SNR Scalability |
| 3 | Temporal Scalability |
| 4 | Data partitioning |
| 5 | Extension bitstream |
| 6 | Private Stream |
| 7 | Multi-view Profile |
| 8 | Combined Scalability |
| 9 | MVC video sub-bitstream |
| 10-14 | Reserved |
| 15 | Base layer or MVC base view sub-bitstream or AVC video sub-bitstream of MVC |

In MPEG-2 TS, a hierarchy extension descriptor may provide additional information regarding a corresponding program component, and hence a respective temporal sub-layer. For instance, when a hierarchy extension descriptor is present, the hierarchy extension descriptor is used to specify the dependency of layers present in different elementary streams. Unlike a hierarchy descriptor, a hierarchy extension descriptor may indicate which layers are required to be decoded to successfully decode the temporal sub-layer corresponding to the hierarchy extension descriptor. Table 7-3, below, indicates a syntax of a hierarchy extension descriptor, as specified in FDAM 3.

TABLE 7-3

| Syntax | No. of bits | Mnemonic |
|---|---|---|
| hierarchy_extension_descriptor( ) { | | |
|   descriptor_tag | 8 | uimsbf |
|   descriptor_length | 8 | uimsbf |
|   extension_dimension_bits | 16 | bslbf |
|   hierarchy_layer_index | 6 | uimsbf |
|   temporal_id | 3 | uimsbf |
|   nuh_layer_id | 6 | uimsbf |
|   tref_present_flag | 1 | bslbf |
|   num_embedded_layers | 6 | uimsbf |
|   hierarchy_channel | 6 | uimsbf |
|   Reserved | 4 | bslbf |
|   for( i = 0 ; i < num_embedded_layers ; i++ ) { | | |
|     hierarchy_ext_embedded_layer_index | 6 | uimsbf |
|     Reserved | 2 | bslbf |
|   } | | |
| } | | |

In Table 7-3, above, extension_dimension_bits is a 16-bit field indicating the possible enhancement of the associated program element from the base layer resulting from the program element of the layer with nuh_layer_id equal to 0. The allocation of the bits to enhancement dimensions is as follows.

TABLE 7-4

Semantics of extension_dimension_bits

| Index to bits | Description |
|---|---|
| 0 | Multi-view enhancement |
| 1 | Spatial scalability, including SNR |
| 2 | depth enhancement |
| 3 | AVC base layer |
| 4 | MPEG-2 base layer |
| 3~15 | Reserved |

The i-th bit of extension_dimension_bits being equal to 1 indicates the corresponding enhancement dimension is present.

hierarchy_layer_index is a 6-bit field that defines a unique index of the associated program element in a table of coding layer hierarchies. Indices shall be unique within a single program definition. For video sub-bitstreams of HEVC video streams conforming to one or more profiles defined in Annex G or H of Rec. ITU-T H.265|ISO/IEC 23008-2, this is the program element index, which is assigned in a way that the bitstream order will be correct if associated dependency layers of the video sub-bitstreams of the same access unit are re-assembled in increasing order of hierarchy_layer_index.

tref_present_flag is 1-bit flag, which when set to '0' indicates the TREF field may be present in the PES packet headers in the associated elementary stream. The value of '1' for this flag is reserved.

nuh_layer_id is a 6-bit field specifying the highest nuh_layer_id of the NAL units in the elementary stream associated with this hierarchy_extension_descriptor( ).

temporal_id is a 3-bit field specifying the highest TemporalId of the NAL units in the elementary stream associated with this hierarchy_extension_descriptor( ).

num_embedded_layers is a 6-bit field specifying the number of direct dependent program elements that needs to be accessed and be present in decoding order before decoding of the elementary stream associated with this hierarchy_extension_descriptor ( ).

hierarchy_ext_embedded_layer_index is a 6-bit field defining the hierarchy_layer_index of the program element that needs to be accessed and be present in decoding order before decoding of the elementary stream associated with this hierarchy_extension_descriptor. This field is undefined if the hierarchy_type value is 15.

hierarchy_channel is a 6-bit field indicating the intended channel number for the associated program element in an ordered set of transmission channels. The most robust transmission channel is defined by the lowest value of this field with respect to the overall transmission hierarchy definition. A given hierarchy_channel may at the same time be assigned to several program elements. In other examples, the syntax elements of the hierarchy descriptor may have different semantics.

In the Study of PDAM 7, a hierarchy extension descriptor (i.e., a hierarchy_extension_descriptor) cannot describe temporal dependency. Rather, hierarchy extension descriptors were designed to be used together with a hierarchy descriptor (e.g., a hierarchy_descriptor) in such a way the hierarchy descriptor is used to describe only temporal dependency, whereas other types of dependency are described using hierarchy extension descriptors. This design of hierarchy extension descriptors and hierarchy descriptors creates a dependency such that a hierarchy extension descriptor cannot be used without the existence of a hierarchy descriptor.

Particular techniques of this disclosure may address this dependency. For example, an indication may be included in a hierarchy extension descriptor to indicate temporal scalability. For instance, the hierarchy extension descriptor may include an indication of whether a program element enhances a frame rate of a bitstream. In some examples, the indication of temporal scalability can be part of an extension_dimension_bits syntax element of a hierarchy extension descriptor. This may be done by updating the semantics of the extension_dimension_bits syntax element to support description of temporal scalability as follows: when all 16 bits of the extension_dimension_bits syntax element are equal to 0, it indicates temporal enhancement. For instance, all bits of the syntax element (e.g., extension_dimension_bits) being equal to a particular value (e.g., 0) indicates a program element enhances the frame rate of a bitstream.

A hierarchy extension descriptor may indicate temporal scalability in other ways. For example, one of the reserved bits of the extension_dimension_bits syntax element may be used to indicate the temporal scalability. For instance, a single bit of a syntax element (e.g., extension_dimension_bits) may indicate whether a program element enhances the frame rate of a bitstream. In an example, one bit is added to the extension_dimension_bits syntax element such that the extension_dimension_bits syntax element now has 17 bits. In this example, the additional bit indicates temporal scalability. For instance, a syntax element (e.g., extension_dimension_bits) may consist of 17 bits and a last bit of the syntax element may indicate whether a program element enhances the frame rate of a bitstream.

Hence, in accordance with an example of this disclosure, a video processing device, such as MANE 17 or source device 12, may determine whether a current program element enhances a frame rate of a bitstream. The current program element may include encoded video data. A video processing device may be or comprise a device configured to process video data, such as a video encoding device, a video decoding device, an intermediate video device such as a MANE, a video streaming device, a computing device generating files containing encoded video data, or another type of device. In this example, the video processing device may include, in a descriptor (e.g., a hierarchy extension descriptor) corresponding to the current program element, syntax elements (e.g., hierarchy_ext_embedded_layer_index syntax elements) indicating layer indices of program elements that need to be accessed and be present in decoding order before decoding the current program element. In this example, the video processing device may include, in the descriptor corresponding to the current program element, an indication of whether the current program element enhances the frame rate of the bitstream. In some examples, each of the program elements corresponds to a respective temporal sub-layer.

In a corresponding example, a video processing device, such as MANE 17 or destination device 14, may determine, based on syntax elements (e.g., hierarchy_ext_embedded_layer_index syntax elements) in a descriptor (e.g., a hierarchy extension descriptor) corresponding to a current program element, program elements that need to be accessed and be present in decoding order before decoding the current program element. In this example, the video processing device may determine, based on an indication in the descriptor corresponding to the current program element, whether the current program element enhances the frame rate of a bitstream. In this example, the bitstream may result from a set of one or more program elements that need to be accessed and be present in decoding order before decoding the current program element.

In the Study of PDAM 7, both HEVC operation point descriptors (e.g., an hevc_operation_point_descriptor) and HEVC extension descriptors (e.g., an hevc_extension_descriptor) provide means to signal operation point information. Such operation point information includes the signaling of profile, tier and level (PTL) information. However, the signaling of PTL information for operation points in HEVC operation point descriptors and HEVC extension descriptors is not aligned with the signaling of PTL information in the codec level, i.e., in SHVC and MV-HEVC standards. In the codec level, each layer that is included in an operation point is assigned its own PTL information.

Additional techniques of this disclosure may address this problem. For instance, in accordance with a technique of this disclosure, operation points and PTL information are signaled as follows. A list of PTL information sets, each including PTL information, is signaled in a descriptor for a program. A list of operation points that are available for a program is also signaled in a descriptor. In some examples, the descriptor including the list of operation points is a different descriptor from the descriptor containing the list of PTL information sets. In other examples, the descriptor including the list of operation points is the same descriptor as the descriptor containing the list of PTL information sets. Each layer included in an operation point as a layer to be decoded (i.e., as included in the sub-bitstream used to decode the operation point) is given an index referring to a set of PTL information. In other examples, each layer included in an operation point as an output layer is given an index referring to a set of PTL information.

Thus, in accordance with an example of this disclosure, a video processing device, such as source device 12, MANE 17, or another device, may signal, in a descriptor for a program comprising one or more elementary streams, a plurality of PTL syntax element sets. The one or more elementary streams may comprise encoded video data. For each respective layer of each respective operation point of a plurality of operation points of the program, the video processing device may assign respective PTL information to the respective layer of the respective operation point. Additionally, the video processing device may signal, in the descriptor for the program or another descriptor for the program, a plurality of operation point syntax element sets. In this example, each respective operation point syntax element set of the plurality of operation point syntax element sets specifies a respective operation point of the plurality of operation points. Furthermore, in this example, for each respective layer of the respective operation point, the respective operation point syntax element includes a respective syntax element identifying a respective PTL syntax element set of the plurality of PTL syntax element sets specifying the respective PTL information assigned to the respective layer of the respective operation point.

In a corresponding example, a video processing device, such as MANE 17, destination device 14, or another device, may obtain, from a descriptor for a program may comprise one or more elementary streams, a plurality of PTL syntax element sets. In this example, each respective PTL syntax element set of the plurality of PTL syntax element sets comprising syntax elements specifying respective PTL information. Furthermore, in this example, the video processing device may obtain, from the descriptor for the program, a plurality of operation point syntax element sets. In this example, each respective operation point syntax element set of the plurality of operation point syntax element sets specifies a respective operation point of a plurality of operation points. Additionally, in this example, for each respective operation point syntax element set of the plurality of operation point syntax element sets, the video processing device may determine, for each respective layer of the respective operation point specified by the respective operation point syntax element set, based on a respective syntax element in the respective operation point syntax element set, which of the PTL syntax element sets specifies the PTL information assigned to the respective layer.

Aggregation of elementary streams of an operation point described in sub-clause 2.17.4 of the Study of PDAM 7 can be summarized as follows. If an operation point is signaled, either in hevc_operation_point descriptor or hevc_extension_descriptor, an HEVC layer list for an operation point is established based on the elementary streams or layer list described for the operation point in the descriptor. Otherwise, if neither hevc_operation_point_descriptor nor hevc_extension_descriptor is present, each elementary stream is considered as an operation point and HEVC layer list is established based on either hierarchy_descriptor or hierarchy_extension_descriptor. Otherwise, a default list of operation points is described in Table Amd 7-5 of the Study of PDAM 7. Table Amd. 7-5 is reproduced below.

TABLE Amd7-5

Default HEVC layer list if no hierarchy descriptors are used

| Existing stream types | $OP_1$ | $OP_2$ | $OP_3$ | $OP_4$ |
|---|---|---|---|---|
| 0x24 | 0x24 | | | |
| 0x24, 0x25 | 0x24 | 0x24, 0x25 | | |
| 0x24, 0x27 | 0x24 | 0x24, 0x27 | | |
| 0x24, 0x25, 0x27 | 0x24 | 0x24, 0x25 | 0x24, 0x25, 0x27 | |
| 0x24, 0x25, 0x27, 0x28 | 0x24 | 0x24, 0x25 | 0x24, 0x27 (cf. note below) | 0x24, 0x25, 0x27, 0x28 |
| 0x24, 0x29 | 0x24 | 0x24, 0x29 | | |
| 0x24, 0x29, 0x2A | 0x24 | 0x24, 0x29 | 0x24, 0x29, 0x2A | |
| 0x24, 0x25, 0x29 | 0x24 | 0x24, 0x25 | 0x24, 0x25, 0x29 | |
| 0x24, 0x25, 0x29, 0x2A | 0x24 | 0x24, 0x25 | 0x24, 0x25, 0x29 | 0x24, 0x25, 0x29, 0x2A |

The above method for aggregation of elementary streams may have at least the following problems. In a first problem with the above method for aggregation of elementary streams, when no descriptor for operation point is present, it is assumed that each elementary stream is an operation point. This may have a backward compatibility problem to Hattori et al., "Text of ISO/IEC 13818-1:2013/FDAM 5—Transport of MVC depth video sub-bitstream and support for HEVC low delay coding mode," ISO/IEC JTC1/SC29/WG11, MPEG2014/N14315, April 2014, Valencia, ES (hereinafter, "Amendment 5 of ISO/IEC 13818-1: 2013"). In the Amendment 5 of ISO/IEC 13818-1:2013, an HEVC temporal video sub-bitstream together with all of its associated HEVC temporal video subset is considered as one operation point. In other words, an elementary stream that only enhances the temporal aspect of its reference elementary stream is not considered to be another operation point. Therefore, when no descriptor for operation point is present, only an elementary stream with stream type 0x24, 0x27 and 0x29 should be considered as an operation point by itself, whereas elementary streams with stream type 0x25, 0x28 and 0x2A should be considered as part of operation point that is associated with the elementary stream with type 0x24, 0x27 and 0x29 that those elementary streams enhance. In the Study of PDAM7, type 0x24 indicates HEVC video stream or an HEVC temporal video sub-bitstream or HEVC base sub-partition. Furthermore, in the Study of PDAM7, type 0x27 indicates an HEVC enhancement sub-partition which includes TemporalId 0 of an HEVC video stream conforming to one or more profiles defined in Annex G of ITU-T Rec. H.265|ISO/IEC 23008-2. Furthermore, in the Study of PDAM7, type 0x28 indicates an HEVC temporal enhancement sub-partition of an HEVC video stream conforming to one or more profiles defined in Annex G of ITU-T Rec. H.265|ISO/IEC 23008-2. In the Study of PDAM8, type 0x29 indicates an HEVC enhancement sub-partition which includes TemporalId 0 of an HEVC video stream conforming to one or more profiles defined in Annex H of ITU-T Rec. H.265|ISO/IEC 23008-2. In the Study of PDAM 7, type 0x2A indicates a HEVC temporal enhancement sub-partition of an HEVC video stream conforming to one or more profiles defined in Annex H of ITU-T Rec. H.265|ISO/IEC 23008-2.

In a second problem with the above method for aggregation of elementary streams, hevc_operation_point_descriptor and hevc_extension_descriptor are proposed to be replaced by new hevc_extension_descriptor. Consequently, the descriptor for aggregation of elementary stream of an operation point must also be updated. As defined in the Study of PDAM 7, HEVC layer component aggregation may be the concatenation of all HEVC layer components with the same output time from all HEVC sub-partitions indicated in an HEVC layer list in the order indicated by the HEVC layer list, resulting in a valid access unit as defined in Annex F of Rec. ITU-T H.265|ISO/IEC 23008-2

In accordance with a technique of this disclosure, the aggregation of elementary stream may be modified as follows. If the descriptor that carries operation point information is present for a program, an HEVC layer list for each operation point described in the descriptor is established based on information for the operation point and shall contains layers that are included for the operation point. Otherwise, if the descriptor that carries operation point information is not present for a program, each elementary stream $ES_i$ with stream type 0x24, 0x27 and 0x29 corresponds to a single target operation point $OP_i$. The aggregation of layers included in the $ES_i$ and elementary streams pointed to by the syntax element hierarchy_ext_embedded_layer_index of the hierarchy_extension_descriptor for the ESi, if present, ordered according to the increasing order of LayerId, result in the HEVC layer list. If the elementary stream signaled by hierarchy_ext_embedded_layer_index has further dependencies, these dependencies shall be prepended in a recursive manner.

This disclosure describes improvements for the design MPEG-2 Transport Stream (TS) for carriage of HEVC extensions. A summary of the techniques of this disclosure is given herein, with a detailed implementation of some techniques provided in later sections. Some of these techniques may be applied independently and some of them may be applied in combination.

Figure 2:
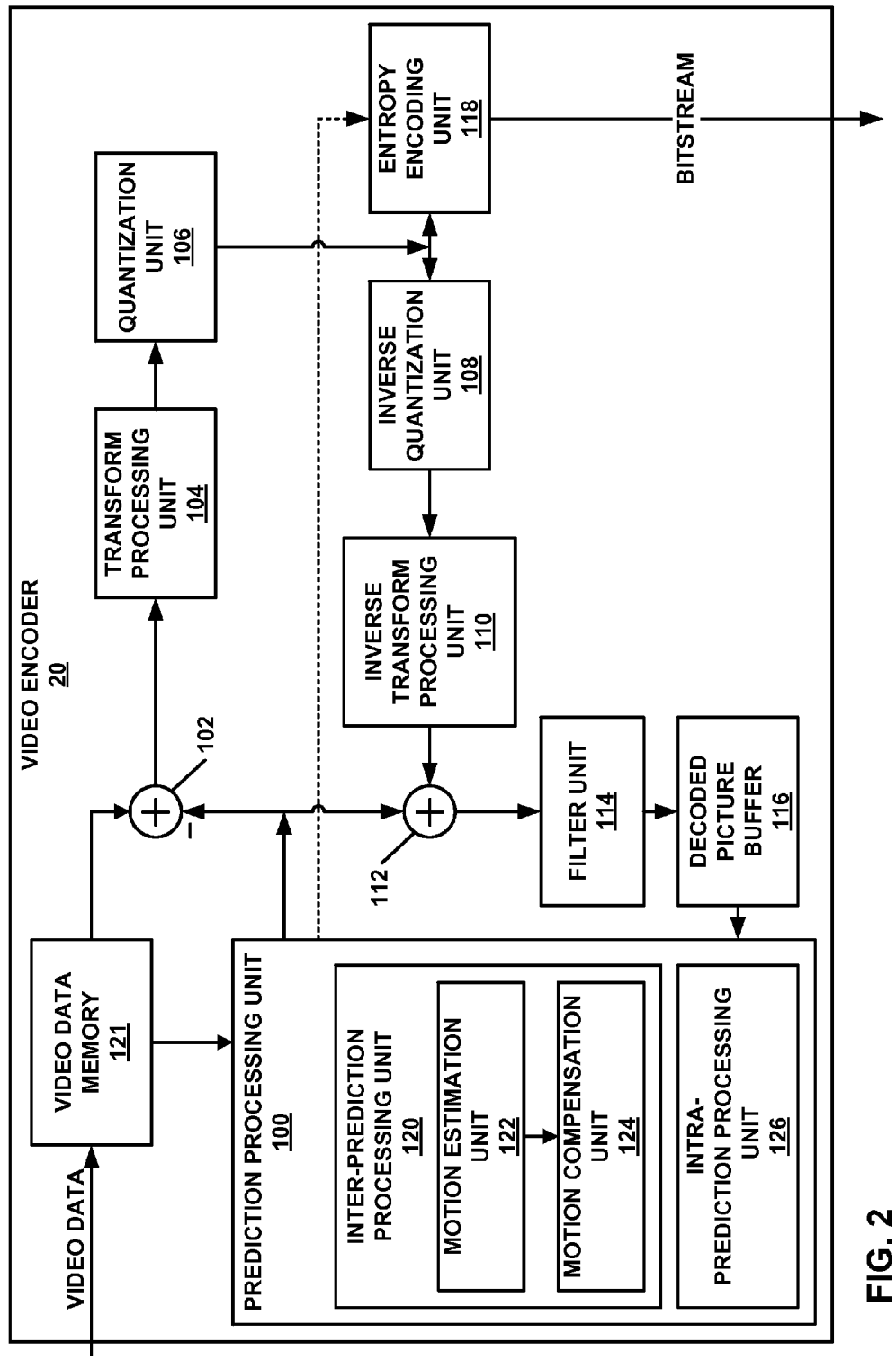
FIG. 2 is a block diagram illustrating an example video encoder.

FIG. 2 is a block diagram illustrating an example video encoder 20. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

In some examples, video encoder 20 may further include video data memory 121. Video data memory 121 may store video data to be encoded by the components of video encoder 20. The video data stored in video data memory 121 may be obtained, for example, from video source 18. Decoded picture buffer 116 may be a reference picture memory that stores reference video data for use in encoding video data by video encoder 20, e.g., in intra- or inter-coding modes. Video data memory 121 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 121 and decoded picture buffer 116 may be provided by the same memory device or separate memory devices. In various examples, video data memory 121 may be on-chip with other components of video encoder 20, or off-chip relative to those components.

Video encoder 20 may receive video data. Video encoder 20 may encode each CTU in a slice of a picture of the video data. Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index indicating a position in RefPicList0 of the reference picture containing the reference region for the PU. In addition, motion estimation unit 122 may generate a motion vector indicating a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index indicating a position in RefPicList0 or RefPicList1 of the reference picture that contains the reference region, a motion vector indicating a spatial displacement between a prediction block of the PU and a reference location associated with the reference region, and one or more prediction direction indicators indicating whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes indicating positions in RefPicList0 and RefPicList1 of the reference pictures containing the reference regions. In addition, motion estimation unit 122 may generate motion vectors indicating spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb, and Cr coding blocks) of a CU and the selected predictive blocks (e.g., predictive luma, Cb, and Cr blocks) of the PUs of the CU, residual blocks (e.g., luma, Cb, and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture containing the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a CAVLC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream including entropy-encoded data generated by entropy encoding unit 118.

Figure 3:
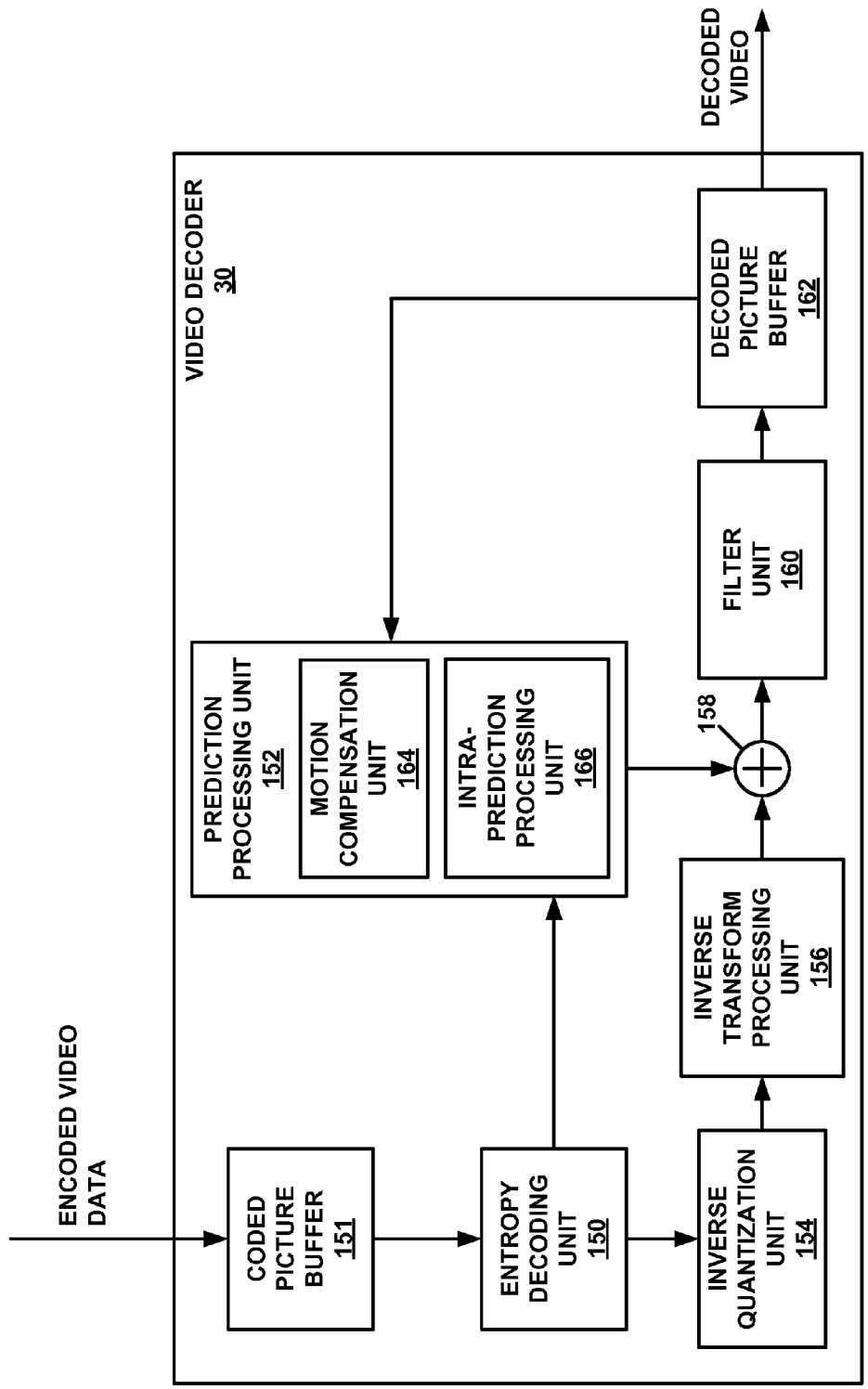
FIG. 3 is a block diagram illustrating an example video decoder.

FIG. 3 is a block diagram illustrating an example video decoder 30. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

In some examples, video decoder 30 may further include video data memory. The video data memory may store video data, such as an encoded video bitstream, to be decoded by the components of video decoder 30. The video data stored in the video data memory may be obtained, for example, from channel 16, e.g., from a local video source, such as a camera, via wired or wireless network communication of video data, or by accessing physical data storage media. The video data memory may form a coded picture buffer (CPB) 151 and a decoded picture buffer 162. CPB 151 stores encoded video data from an encoded video bitstream. Decoded picture buffer 162 may be a reference picture memory that stores reference video data for use in decoding video data by video decoder 30, e.g., in intra- or inter-coding modes. CBP 151 and decoded picture buffer 162 may be formed by any of a variety of memory devices, such as DRAM, including SDRAM, MRAM, RRAM, or other types of memory devices. CPB 151 and decoded picture buffer 162 may be provided by the same memory device or separate memory devices. In various examples, the video data memory may be on-chip with other components of video decoder 30, or off-chip relative to those components.

CPB 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units. As part of decoding the bitstream, entropy decoding unit 150 may parse and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive blocks (e.g., predictive luma, Cb, and Cr blocks) for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive blocks (e.g., predictive luma, Cb, and Cr blocks) for the PU.

Reconstruction unit 158 may use the residual values from the transform blocks (e.g., luma, Cb, and Cr transform blocks) of TUs of a CU and the predictive blocks (e.g., luma, Cb, and Cr blocks) of the PUs of the CU, i.e., either intra-prediction data or inter-prediction data, as applicable, to reconstruct the coding blocks (e.g., luma, Cb, and Cr coding blocks) of the CU. For example, reconstruction unit 158 may add samples of the transform blocks (e.g., luma, Cb, and Cr transform blocks) to corresponding samples of the predictive blocks (e.g., predictive luma, Cb, and Cr blocks) to reconstruct the coding blocks (e.g., luma, Cb, and Cr coding blocks) of the CU.

Filter unit 160 may perform a deblocking operation to reduce blocking artifacts associated with the coding blocks (e.g., luma, Cb, and Cr coding blocks) of the CU. Video decoder 30 may store the coding blocks (e.g., luma, Cb, and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb, and Cr blocks) in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

This following section of this disclosure describes example implementation details of particular techniques of this disclosure. In the following section, underlined text indicates added text.

As mentioned above, an indication may be included in a hierarchy extension descriptor to indicate temporal scalability. For instance, the hierarchy extension descriptor may include an indication of whether a program element enhances a frame rate of a bitstream. Table Amd. 7-3, below, is an example syntax table of hierarchy extension descriptor to accommodate temporal scalability.

TABLE Amd. 7-3

| Hierarchy extension descriptor | | |
|---|---|---|
| Syntax | No. of bits | Mnemonic |
| hierarchy_extension_descriptor( ) { | | |
|   descriptor_tag | 8 | uimsbf |
|   descriptor_length | 8 | uimsbf |
|   extension_dimension_bits | 16 | bslbf |
|   <u>no_temporal_scalability_flag</u> | <u>1</u> | <u>bslbf</u> |
|   Reserved | 7 | bslbf |
|   hierarchy_layer_index | 6 | uimsbf |
|   temporal_id | 3 | uimsbf |
|   nuh_layer_id | 6 | uimsbf |
|   tref_present_flag | 1 | bslbf |
|   num_embedded_layers | 6 | uimsbf |
|   hierarchy_channel | 6 | uimsbf |
|   Reserved | 4 | bslbf |
|   for( i = 0 ; i < num_embedded_layers ; i++ ) { | | |
|     hierarchy_ext_embedded_layer_index | 6 | uimsbf |
|     Reserved | 2 | bslbf |
|   } | | |
| } | | |

In the example of Table Amd. 7-3, no_temporal_scalability_flag is a 1-bit flag, which when set to '0' indicates that the associated program element enhances the frame rate of the bitstream resulting from the program elements referenced by the hierarchy_embedded_layer_index. The value of '1' for this flag is reserved. The semantics of other syntax elements of the hierarchy_extension_descriptor may remain the same as indicated above. Thus, in some examples, the indication of whether the current program element enhances the frame rate of a bitstream may consist of a 1-bit flag separate from a syntax element indicating enhancements of the current program element, relative to a base layer.

In another example to indicate temporal scalability in a hierarchy extension descriptor, the semantic of extension_dimension_bits is updated as follows:

extension_dimension_bits—A 16-bit field indicating the possible enhancement of the associated program element from the base layer resulting from the program element of the layer with nuh_layer_id equal to 0. When extension_dimension_bits is equal to 0, it indicates that the associated program element enhances the frame rate of the bit-stream resulting from the program elements referenced by the hierarchy_embedded_layer_index Thus, in some examples of this disclosure, the indication whether the current program element enhances the frame rate of a bitstream may be part of a syntax element (e.g., extension_dimension_bits) that indicates enhancements of the current program element, relative to a base layer. Furthermore, in some such examples, all bits of the syntax element being equal to a particular value (e.g., 0) indicates the current program element enhances the frame rate of the bitstream.

In another example indicating temporal scalability in a hierarchy extension descriptor, one of the reserved bits of the syntax element extension_dimension_bits is used to indicate temporal scalability. Thus, in some examples of this disclosure, a single bit of a syntax element (e.g., extension_dimension_bits) indicates whether a current program element enhances the frame rate of a bitstream. This example may be implemented by changing Table 7-4 is shown as below in Table Amd. 7-4:

TABLE Amd. 7-4

| Semantics of extension dimension bits | |
|---|---|
| Index to bits | Description |
| 0 | Multi-view enhancement |
| 1 | Spatial scalability, including SNR |
| 2 | Depth enhancement |
| 3 | AVC base layer |
| 4 | MPEG-2 base layer |
| <u>5</u> | <u>Temporal enhancement</u> |
| <u>6</u>~15 | Reserved |

As indicated above, particular techniques of this disclosure provide for indicating, in a descriptor, PTL information for each layer of an operation point. These techniques may be implemented in various ways. For example, the signaling of operation point and PTL information may be implemented using an HEVC extension descriptor including the syntax shown in the table below.

| HEVC extension descriptor | | |
|---|---|---|
| Syntax | No. of bits | Mnemonic |
| HEVC_extension_descriptor ( ) { | | |
|   descriptor_tag | 8 | uimsbf |
|   descriptor_length | 8 | uimsbf |
|   num_profile_tier_level | 8 | uimsbf |
|   for( i=0; i < num_profile_tier_level; i++ ) { | | |
|     profile_space | 2 | uimsbf |
|     tier_flag | 1 | bslbf |
|     profile_idc | 5 | uimsbf |
|     profile_compatibility_idc | 32 | bslbf |
|     progressive_source_flag | 1 | bslbf |
|     interlaced_source_flag | 1 | bslbf |
|     non_packed_constraint_flag | 1 | bslbf |
|     frame_only_constraint_flag | 1 | bslbf |
|     reserved_zero_44bits | 44 | bslbf |
|     level_idc | 8 | uislbf |
|   } | | |
|   num_operation_points | 8 | uimsbf |
|   for( i=0; i < num_operation_points; i++ ) { | | |
|     max_temporal_id | 3 | bslbf |
|     reserved_bits | 5 | bslbf |
|     num_layers_in_operation_point | 6 | uimsbf |
|     reserved_bits | 2 | bslbf |
|     for( j=0; j < num_layers_in_operation_point; j++ ) | | |
|     { | | |
|       reserved_bits | 1 | bslbf |
|       layer_id_included | 6 | bslbf |
|       output_layer_flag | 1 | bslbf |
|       ptl_index | 8 | bslbf |
|     } | | |
|     average_bit_rate | 16 | uimsbf |
|     maximum_bit_rate | 16 | uimsbf |
|     constant_frame_rate_mode | 1 | bslbf |
|     frame_rate | 15 | uimsbf |
|   } | | |
| } | | |

In table above, num_profile_tier_level is an 8-bit field specifying the number of profile, tier and level structures specified by this descriptor. Thus, in some examples, a video processing device may determine, based on a syntax element (e.g., num_profile_tier_level) in the descriptor for the program, the number of PTL syntax element sets in the plurality of PTL syntax element sets. Similarly, in some examples, a video processing device may signal, in the first descriptor for the program, a syntax element (e.g., num_profile_tier_level) indicating the number of PTL syntax element sets in the plurality of PTL syntax element sets.

profile_space is a 2-bit field specifying the context for the interpretation of profile_idc for all values of i in the range of 0 to 31, inclusive. In this example, profile_space shall not be assigned values other than those specified in Annex A or subclause G.11 or in subclause H.11 of Rec. ITU-T H.265|ISO/IEC 23008-2. Other values of profile_idc are reserved for future use by ITU-T|ISO/IEC.

tier_flag is a 1-bit field specifying the tier context for the interpretation of level_idc as specified in Annex A or subclause G.11 or subclause H.11 of Rec. ITU-T H.265|ISO/IEC 23008-2.

profile_idc is a 5-bit field that, when profile_space is equal to 0, indicates a profile to which the CVS resulting from HEVC layer aggregation of the HEVC sub-partition included in the specified operation point and all HEVC sub-partitions on which this sub-partition depends conforms as specified in Annex A or of Rec. ITU-T H.265|ISO/IEC 23008-2. profile_idc shall not be assigned values other than those specified in Annex A or G.11 or H.11 of Rec. ITU-T H.265|ISO/IEC 23008-2. Other values of profile_idc are reserved for future use by ITU-T|ISO/IEC.

profile_compatibility_indication, progressive_source_flag, interlaced_source_flag, non_packed_constraint_flag, frame_only_constraint_flag, reserved_zero_44 bits, level_idc—When the HEVC extension video descriptor applies to an HEVC enhancement sub-partition, these fields shall be coded according to the semantics defined in Rec. ITU-T H.265|ISO/IEC 23008-2 for general_profile_space, general_tier_flag, general_profile_idc, general_profile_compatibility_flag[i], general_progressive_source_flag, general_interlaced_source_flag, general_non_packed_constraint_flag, general_frame_only_constraint_flag, general_reserved_zero_44 bits, general_level_idc, respectively, for the corresponding HEVC sub-partition, and the HEVC video stream resulting from HEVC layer aggregation of the HEVC sub-partition to which the HEVC video descriptor is associated with all HEVC sub-partitions on which this sub-partition depends shall conform to the information signaled by these fields.

level_idc is an 8-bit field indicating a level to which the CVS conforms as specified in Annex A, G.11 or H.11 of Rec. ITU-T H.265|ISO/IEC 23008-2. level_idc shall not be assigned values of level_idc other than those specified in Annex A, G.11 or H.11 of Rec. ITU-T H.265|ISO/IEC 23008-2. Other values of level_idc are reserved for future use by ITU-T|ISO/IEC.

Thus, in some examples, a video processing device may determine, based on a respective profile syntax element (e.g., profile_idc) in the respective PTL syntax element set, a profile to which a coded video sequence conforms. Furthermore, the video processing device may determine, based on a respective tier syntax element (e.g., tier_flag) in the respective PTL syntax element set, a context for interpretation of a respective level indicator syntax element (e.g., level_idc) in the respective PTL syntax element set. In such examples, the video processing device may determine, based on the respective level indicator syntax element in the respective PTL syntax element set, a level to which the coded video sequence conforms.

Similarly, in some examples, for each respective PTL syntax element set of the plurality of PTL syntax element sets, a video processing device may signal, in the respective PTL syntax element set, a respective profile syntax element (e.g., profile_idc) specifying a profile to which a coded video sequence conforms. Furthermore, the video processing device may signal, in the respective PTL syntax element set, a respective tier syntax element (e.g., tier_flag). The respective tier syntax element may specify a context for interpretation of a respective level indicator syntax element (e.g., level_idc) in the respective PTL syntax element set. In such examples, the video processing device may signal, in the respective PTL syntax element set, the respective level indicator syntax element. The respective level indicator syntax element may indicate a level to which a coded video sequence conforms.

num_operation_points is an 8-bit field specifying the number of operation points specified by this descriptor. Thus, in some examples, a video processing device may determine, based on a syntax element (e.g., num_operation_points) in the descriptor, the number of operation point syntax element sets in the plurality of operation point syntax element sets. Similarly, in some examples, a video processing device may signal a syntax element (e.g., num_operation_points) in the descriptor indicating the number of operation point syntax element sets in the plurality of operation point syntax element sets. In other examples, the syntax element may be determined based on a syntax element in a descriptor separate from a descriptor including the PTL syntax elements sets. Likewise, in some examples, a video processing device may signal this syntax element in a descriptor separate from a descriptor including the PTL syntax elements sets.

max_temporal_id is a 3-bit field specifying the highest TemporalId of the NAL units of the layers in the i-th operation point.

num_layers_in_operation_point is a 6-bit field specifying the number of layers that are included in the i-th operation point. Thus, in some examples, for each respective operation point syntax element set of a plurality of operation point syntax element sets, a video processing device may signal the number of layers of the respective operation point specified by the respective operation point syntax element set. Similarly, in some examples, for each respective operation point syntax element set of the plurality of operation point syntax element sets, the video processing device may determine, based on a syntax element (e.g., num_layers_in_operation_point) in a descriptor, the number of layers of the respective operation point specified by the respective operation point syntax element set. In other examples, the syntax element (e.g., num_layers_in_operation_point) may be signaled in a descriptor separate from the descriptor including the PTL syntax element sets.

layer_id_ is a 6-bit field specifying the nuh_layer_id of the layer that is included in the i-th operation point.

output_layer_flag is a 1-bit field which, when assigned value '1', indicates that a layer with nuh_layer_id equal to layer_id_included is an output layer when the i-th operation point is decoded. When output_layer_flag is assigned value '0', the layer with nuh_layer_id equal to layer_id_included is not an output layer when the i-th operation point is decoded.

ptl_index is an 8-bit field specifying the index of profile, tier and level that is assigned to the j-th layer in the i-th operation point.

average_bitrate is a 16-bit field indicating the average bit rate, in 1000 bits per second, of the HEVC layered video stream corresponding to the i-th operation point.

maximum_bitrate is a 16-bit field indicating the maximum bit rate, in kbit per second, of the HEVC layered video stream corresponding to the i-th operation point.

constant_frame_rate_mode is a 1-bit field specify how the frame_rate as specified below is interpreted.

frame_rate is a 15-bit field indicating the maximum picture rate of the HEVC layered video stream corresponding to the i-th operation point. If constant_frame_rate_mode equals 0, the frame_rate is measured in frames per second. Otherwise, if constant_frame_rate_mode equals 1, the frame_rate is measured in frames per 1.001 seconds.

Thus, in some examples, for each respective operation point syntax element set of a plurality of operation point syntax element sets, a video processing device may signal a respective first syntax element (e.g., max_temporal_id) specifying a maximum temporal identifier of the respective operation point specified by the respective operation point syntax element set. Additionally, the video processing device may signal a respective second syntax element (e.g., average_bit_rate) specifying an average bit rate of the respective operation point specified by the respective operation point syntax element set. The video processing device may also signal a respective third syntax element (e.g., maximum_bit_rate) specifying a maximum bit rate of the respective operation point specified by the respective operation point syntax element set. The video processing device may signal a respective fourth syntax element (e.g., frame_rate) specifying a maximum picture rate of a High Efficiency Video Coding (HEVC) layered video stream corresponding to the respective operation point specified by the respective operation point syntax element set.

Similarly, in some examples, for each respective operation point syntax element set of the plurality of operation point syntax element sets, a video processing device may determine, based on a respective first syntax element (e.g., max_temporal_id) in the respective operation point syntax element set, a maximum temporal identifier of the respective operation point specified by the respective operation point syntax element set. The video processing device may also determine, based on a respective second syntax element (e.g., average_bit_rate) in the respective operation point syntax element set, an average bit rate of the respective operation point specified by the respective operation point syntax element set. Furthermore, the video processing device may determine, based on a respective third syntax element (e.g., maximum_bit_rate) in the respective operation point syntax element set, a maximum bit rate of the respective operation point specified by the respective operation point syntax element set. Moreover, the video processing device may determine, based on a respective fourth syntax element (e.g., frame_rate) in the respective operation point syntax element set, a maximum picture rate of a High Efficiency Video Coding (HEVC) layered video stream corresponding to the respective operation point specified by the respective operation point syntax element set.

As indicated above, particular techniques of this disclosure modify the aggregation of the elementary stream. In accordance with some examples, the HEVC layer list for one or more operation points is specified according as follows: If the program map table (PMT) contains an hevc_extension_descriptor, the aggregation of layers that are indicated included in the operation point by the syntax element layer_id_included, ordered according to the increasing value of LayerId value, result in the HEVC layer list. Otherwise, each elementary stream $ES_i$ with stream type 0x24, 0x27 and 0x29 corresponds to a single target operation point $OP_i$. The aggregation of layers included in the $ES_j$ and elementary streams pointed to by the syntax element hierarchy_ext_embedded_layer_index of the hierarchy_extension_descriptor for the ESi, if present, ordered according to the increasing order of LayerId, result in the HEVC layer list. If the ES signaled by hierarchy_ext_embedded_layer_index has further dependencies, these dependencies shall be prepended in a recursive manner. Each elementary stream $ES_j$ with stream type 0x25, 0x28 or 0x2A are considered as part of operation point associated elementary stream that it enhances.

FIG. 4A is a flowchart illustrating a first example operation to process video data, in accordance with a technique of this disclosure. The flowcharts of this disclosure are examples. Other examples in accordance with techniques of this disclosure may include more, fewer, or different actions. Furthermore, in some examples, actions may be performed in different orders or in parallel.

In the example of FIG. 4A, a video processing device, such as MANE 17, source device 12, or another device, determines whether a current program element enhances a frame rate of a bitstream (400). In the example of FIG. 4A, the bitstream may result from a set of one or more program elements that need to be accessed and be present in decoding order before decoding the current program element.

Furthermore, the video processing device includes, in a descriptor corresponding to the current program element, syntax elements indicating layer indices of the program elements that need to be accessed and be present in decoding order before decoding the current program element (402). The video processing device includes, in the descriptor corresponding to the current program element, an indication of whether the current program element enhances the frame rate of the bitstream (404).

FIG. 4B is a flowchart illustrating a second example operation to process video data, in accordance with a technique of this disclosure. In the example of FIG. 4B, a video processing device, such as MANE 17, destination device 14, or another device, determines, based on syntax elements in a descriptor corresponding to a current program element, program elements that need to be accessed and be present in decoding order before decoding the current program element (450).

Furthermore, the video processing device determines, based on an indication in the descriptor corresponding to the current program element, whether the current program element enhances the frame rate of a bitstream (452). In the example of FIG. 4B, the bitstream results from a set of one or more program elements that need to be accessed and be present in decoding order before decoding the current program element.

Figure 5B:
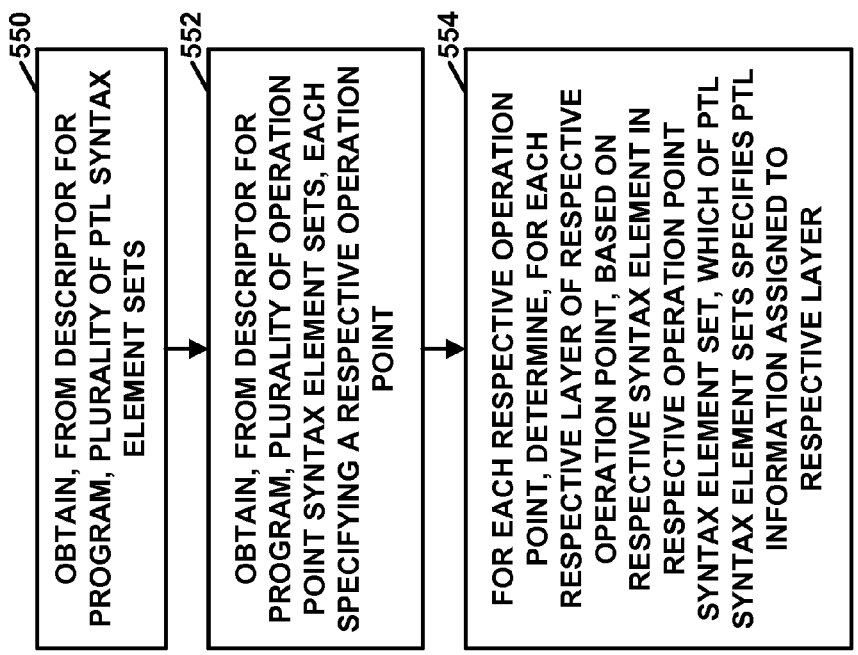
FIG. 5B is a flowchart illustrating a fourth example operation to process video data, in accordance with a technique of this disclosure.
Figure 5A:
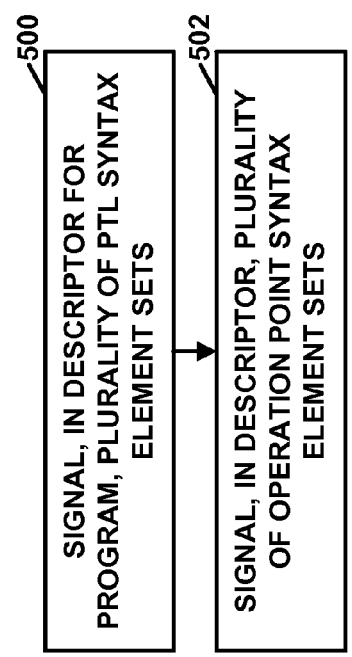
FIG. 5A is a flowchart illustrating a third example operation to process video data, in accordance with a technique of this disclosure.

FIG. 5A is a flowchart illustrating a third example operation to process video data, in accordance with a technique of this disclosure. The operation of FIG. 5A may be performed in conjunction with the example operation of FIG. 4A. In the example of FIG. 5A, a video processing device, such as source device 12, MANE 17, or another device, signals, in a descriptor for a program comprising one or more elementary streams, a plurality of PTL syntax element sets (500).

Additionally, the video processing device signals, in the descriptor or a different descriptor (e.g., a first or a second descriptor) for the program, a plurality of operation point syntax element sets (504). In the example of FIG. 5A, each respective operation point syntax element set of the plurality of operation point syntax element sets specifies a respective operation point of the plurality of operation points. For each respective layer of the respective operation point, the respective operation point syntax element set includes a respective syntax element identifying a respective PTL syntax element set of the plurality of PTL syntax element sets specifying PTL information assigned to the respective layer of the respective operation point. The respective operation point may have a plurality of layers. The first and/or the second descriptor may be in a transport stream. In other examples, the first and/or second descriptors are in a program stream or elsewhere.

FIG. 5B is a flowchart illustrating a fourth example operation to process video data, in accordance with a technique of this disclosure. The operation of FIG. 5B may be performed in conjunction with the example operation of FIG. 4B.

In the example of FIG. 5B, a video processing device, such as MANE 17, destination device 14, or another device, obtains, from a descriptor for a program comprising one or more elementary streams, a plurality of PTL syntax element sets (550). Each respective PTL syntax element set of the plurality of PTL syntax element sets comprises syntax elements specifying respective PTL information. Additionally, the video processing device obtains, from the descriptor or another descriptor (e.g., a first or a second descriptor) for the program, a plurality of operation point syntax element sets (552). Each respective operation point syntax element set of the plurality of operation point syntax element sets specifies a respective operation point of a plurality of operation points. The first and/or the second descriptor may be in a transport stream. In other examples, the first and/or second descriptors are in a program stream or elsewhere.

For each respective operation point syntax element set of the plurality of operation point syntax element sets, the video processing device determines, for each respective layer of the respective operation point specified by the respective operation point syntax element set, based on a respective syntax element in the respective operation point syntax element set, which of the PTL syntax element sets specifies the PTL information assigned to the respective layer (554). The respective operation point may have a plurality of layers.

The following paragraphs list a selection of examples of this disclosure.

Example 1

A method of processing video data, the method comprising: including, in a hierarchy extension descriptor, an indication of temporal scalability.

Example 2

The method of example 1, wherein the indication is part of an extension dimension bits syntax element that indicates possible enhancements of an associated program element from a base layer resulting from the program element of the base layer.

Example 3

The method of example 2, wherein all bits of the extension dimension bits syntax element being equal to a particular value indicates temporal enhancement.

Example 4

The method of examples 2 or 3, wherein a reserved bit of the extension dimension bits syntax element indicates temporal scalability.

Example 5

The method of any of examples 2-4, wherein the extension dimension bits syntax element includes an additional bit that indicates temporal scalability.

Example 6

A method of processing video data, the method comprising: obtaining, from a hierarchy extension descriptor, an indication of temporal scalability.

Example 7

The method of example 6, wherein the indication is part of an extension dimension bits syntax element that indicates possible enhancements of an associated program element from a base layer resulting from the program element of the base layer.

Example 8

The method of example 7, wherein all bits of the extension dimension bits syntax element being equal to a particular value indicates temporal enhancement.

Example 9

The method of any of examples 7 or 8, wherein a reserved bit of the extension dimension bits syntax element indicates temporal scalability.

Example 10

The method of any of examples 7-9, wherein the extension dimension bits syntax element includes an additional bit that indicates temporal scalability.

Example 11

A method of processing video data, the method comprising: signaling, in a descriptor for a program, a set of profile, tier, level (PTL) information, wherein the PTL information includes profile, tier, and level information.

Example 12

The method of example 11, further comprising: signaling, in the descriptor for the program, a list of operation points that are available for the program.

Example 13

The method of any of examples 11 or 12, wherein the descriptor is a first descriptor, the method further comprising: signaling, in a second descriptor for the program, a list of operation points that are available for the program.

Example 14

The method of any of examples 11-13, wherein each layer included in one of the operation points as a layer to be decoded corresponds to an index that refers to a set of PTL information from among one or more sets of PTL information.

Example 15

The method of any of examples 11-14, wherein each layer included in one of the operation points as an output layer corresponds to an index that refers to a set of PTL information from among one or more sets of PTL information.

Example 16

A method of processing video data, the method comprising: obtaining, from a descriptor for a program, a set of profile, tier, level (PTL) information, wherein the PTL information includes profile, tier, and level information.

Example 17

The method of example 16, further comprising: obtaining, from the descriptor for the program, a list of operation points that are available for the program.

Example 18

The method of any of examples 16 or 17, wherein the descriptor is a first descriptor, the method further comprising: obtaining, from a second descriptor for the program, a list of operation points that are available for the program.

Example 19

The method of any of examples 16-18, wherein each layer included in one of the operation points as a layer to be decoded corresponds to an index that refers to a set of PTL information from among one or more sets of PTL information.

Example 20

The method of any of examples 16-19, wherein each layer included in one of the operation points as an output layer corresponds to an index that refers to a set of PTL information from among one or more sets of PTL information.

Example 21

A method of processing video data, the method comprising: if a descriptor that carries operation point information is present for a program, establishing a High Efficiency Video Coding (HEVC) layer list for each respective operation point described in the descriptor based on information for the respective operation point, the HEVC layer list containing layers that are included for the respective operation point; and if the descriptor that carries operation point information is not present for the program, each elementary stream with stream type 0x24, 0x27 and 0x29 corresponds to a single target operation point.

Example 22

The method of example 21, wherein the descriptor is in a program map table.

Example 23

A device for processing video data, the device comprising: a memory configured to store the video data, and one or more processors to perform the methods of any of examples 7-28.

Example 24

A device for processing video data, the device comprising means for performing the methods of any of examples 1-22.

Example 26

A computer-readable data storage medium having instructions stored thereon that when executed cause one or more processors to perform the methods of any of examples 1-22.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Furthermore, in some aspects, the functionality described herein may be provided within dedicated hardware and/or software modules configured for processing video data, such as that in a MANE. Also, the techniques could be fully implemented in one or more circuits or logic elements.

The techniques of this disclosure may be implemented in a wide variety of devices or apparatuses, including a wireless communication device (e.g., a wireless handset), an integrated circuit (IC) or a set of ICs (e.g., a chip set). For instance, a device for processing video data may comprise an integrated circuit comprising a video decoder configured to decode the encoded video data, a microprocessor comprising a video decoder configured to decode the encoded video data, a wireless handset comprising a video decoder configured to decode the encoded video data, and so on. Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing an MPEG-2 transport stream for carriage of multi-layer video data, the method comprising:
obtaining, from a first descriptor for a program comprising one or more elementary streams, a plurality of profile, tier, level (PTL) syntax element sets, each respective PTL syntax element set of the plurality of PTL syntax element sets comprising syntax elements specifying respective PTL information;
obtaining, from the first descriptor or a second descriptor for the program, a plurality of operation point syntax element sets, wherein the first descriptor and the second descriptor are in a program map table of the MPEG-2 transport stream and each respective operation point syntax element set of the plurality of operation point syntax element sets specifies a respective operation point of a plurality of operation points; and
for each respective operation point syntax element set of the plurality of operation point syntax element sets, determining, for each respective layer of the respective operation point specified by the respective operation point syntax element set, based on a respective syntax element for the respective layer, which of the PTL syntax element sets specifies the PTL information assigned to the respective layer of the respective operation point, the respective syntax element being in the respective operation point syntax element set, the respective operation point having a plurality of layers.

2. The method of claim 1, further comprising:
for each respective PTL syntax element set of the plurality of PTL syntax element sets:
determining, based on a respective profile syntax element in the respective PTL syntax element set, a profile to which a coded video sequence conforms;
determining, based on a respective tier syntax element in the respective PTL syntax element set, a context for interpretation of a respective level indicator syntax element in the respective PTL syntax element set; and
determining, based on the respective level indicator syntax element in the respective PTL syntax element set, a level to which the coded video sequence conforms.

3. The method of claim 1, further comprising:
determining, based on a syntax element in the first descriptor for the program, the number of PTL syntax element sets in the plurality of PTL syntax element sets.

4. The method of claim 1, further comprising:
determining, based on a syntax element in the first descriptor or the second descriptor, the number of operation point syntax element sets in the plurality of operation point syntax element sets.

5. The method of claim 1, wherein obtaining the plurality of operation point syntax element sets comprises:
for each respective operation point syntax element set of the plurality of operation point syntax element sets, determining, based on a syntax element in the first descriptor or the second descriptor, the number of layers of the respective operation point specified by the respective operation point syntax element set.

6. The method of claim 1, further comprising:
for each respective operation point syntax element set of the plurality of operation point syntax element sets:
determining, based on a respective first syntax element in the respective operation point syntax element set, a maximum temporal identifier of the respective operation point specified by the respective operation point syntax element set;
determining, based on a respective second syntax element in the respective operation point syntax element set, an average bit rate of the respective operation point specified by the respective operation point syntax element set;
determining, based on a respective third syntax element in the respective operation point syntax element set, a maximum bit rate of the respective operation point specified by the respective operation point syntax element set; and
determining, based on a respective fourth syntax element in the respective operation point syntax element set, a maximum picture rate of a High Efficiency Video Coding (HEVC) layered video stream corresponding to the respective operation point specified by the respective operation point syntax element set.

7. A method of processing an MPEG-2 transport stream for carriage of multi-layer video data, the method comprising:
signaling, in a first descriptor for a program comprising one or more elementary streams, a plurality of profile, tier, level (PTL) syntax element sets, each respective PTL syntax element set of the plurality of PTL syntax element sets comprising syntax elements specifying respective PTL information; and
signaling, in the first descriptor or a second descriptor for the program, a plurality of operation point syntax element sets, wherein:
the first descriptor and the second descriptor are in a program map table of the MPEG-2 transport stream,
each respective operation point syntax element set of the plurality of operation point syntax element sets specifies a respective operation point of the plurality of operation points, and
for each respective layer of the respective operation point, the respective operation point syntax element set includes a respective syntax element identifying a respective PTL syntax element set of the plurality of PTL syntax element sets specifying PTL information assigned to the respective layer of the respective operation point, the respective operation point having a plurality of layers.

8. The method of claim 7, wherein signaling the plurality of PTL syntax element sets comprises:
for each respective PTL syntax element set of the plurality of PTL syntax element sets:
signaling, in the respective PTL syntax element set, a respective profile syntax element specifying a profile to which a coded video sequence conforms;

signaling, in the respective PTL syntax element set, a respective tier syntax element, the respective tier syntax element specifying a context for interpretation of a respective level indicator syntax element in the respective PTL syntax element set; and signaling, in the respective PTL syntax element set, the respective level indicator syntax element, the respective level indicator syntax element indicating a level to which the coded video sequence conforms.

9. The method of claim 7, further comprising:
signaling, in the first descriptor for the program, a syntax element indicating the number of PTL syntax element sets in the plurality of PTL syntax element sets.

10. The method of claim 7, further comprising:
signaling, in the first descriptor or the second descriptor, a syntax element indicating the number of operation point syntax element sets in the plurality of operation point syntax element sets.

11. The method of claim 7, wherein signaling the plurality of operation point syntax element sets comprises:
for each respective operation point syntax element set of the plurality of operation point syntax element sets, signaling the number of layers of the respective operation point specified by the respective operation point syntax element set.

12. The method of claim 7, wherein signaling the plurality of operation point syntax element sets comprises:
for each respective operation point syntax element set of the plurality of operation point syntax element sets:
signaling a respective first syntax element specifying a maximum temporal identifier of the respective operation point specified by the respective operation point syntax element set;
signaling a respective second syntax element specifying an average bit rate of the respective operation point specified by the respective operation point syntax element set;
signaling a respective third syntax element specifying a maximum bit rate of the respective operation point specified by the respective operation point syntax element set; and
signaling a respective fourth syntax element specifying a maximum picture rate of a High Efficiency Video Coding (HEVC) layered video stream corresponding to the respective operation point specified by the respective operation point syntax element set.

13. A device for processing an MPEG-2 transport stream for carriage of multi-layer video data, the device comprising:
a data storage medium configured to store encoded video data, and one or more processors configured to:
obtain, from a first descriptor for a program comprising one or more elementary streams comprising the encoded video data, a plurality of profile, tier, level (PTL) syntax element sets, each respective PTL syntax element set of the plurality of PTL syntax element sets comprising syntax elements specifying respective PTL information;
obtain, from the first descriptor or a second descriptor for the program, a plurality of operation point syntax element sets, wherein the first descriptor and the second descriptor are in a program map table of the MPEG-2 transport stream and each respective operation point syntax element set of the plurality of operation point syntax element sets specifies a respective operation point of a plurality of operation points; and for each respective operation point syntax element set of the plurality of operation point syntax element sets, determine, for each respective layer of the respective operation point specified by the respective operation point syntax element set, based on a respective syntax element for the respective layer, which of the PTL syntax element sets specifies the PTL information assigned to the respective layer of the respective operation point, the respective syntax element being in the respective operation point syntax element set, the respective operation point having a plurality of layers.

14. The device of claim 13, wherein the one or more processors are configured to:
for each respective PTL syntax element set of the plurality of PTL syntax element sets:
determine, based on a respective profile syntax element in the respective PTL syntax element set, a profile to which a coded video sequence conforms;
determine, based on a respective tier syntax element in the respective PTL syntax element set, a context for interpretation of a respective level indicator syntax element in the respective PTL syntax element set; and
determine, based on the respective level indicator syntax element in the respective PTL syntax element set, a level to which the coded video sequence conforms.

15. The device of claim 13, wherein the one or more processors are configured to:
determine, based on a syntax element in the first descriptor for the program, the number of PTL syntax element sets in the plurality of PTL syntax element sets.

16. The device of claim 13, wherein the one or more processors are configured to:
determine, based on a syntax element in the first descriptor or the second descriptor, the number of operation point syntax element sets in the plurality of operation point syntax element sets.

17. The device of claim 13, wherein the one or more processors are configured such that, as part of signaling the plurality of operation point syntax element sets, the one or more processors:
for each respective operation point syntax element set of the plurality of operation point syntax element sets, signal the number of layers of the respective operation point specified by the respective operation point syntax element set.

18. The device of claim 13, wherein the one or more processors are configured to:
for each respective operation point syntax element set of the plurality of operation point syntax element sets:
determine, based on a respective first syntax element in the respective operation point syntax element set, a maximum temporal identifier of the respective operation point specified by the respective operation point syntax element set;
determine, based on a respective second syntax element in the respective operation point syntax element set, an average bit rate of the respective operation point specified by the respective operation point syntax element set;
determine, based on a respective third syntax element in the respective operation point syntax element set, a maximum bit rate of the respective operation point specified by the respective operation point syntax element set; and determine, based on a respective fourth syntax element in the respective operation point syntax element set, a maximum picture rate of a High Efficiency Video Coding (HEVC) layered video stream corresponding to the respective operation point specified by the respective operation point syntax element set.

19. The device of claim 13, wherein the device comprises at least one of:
an integrated circuit comprising a video decoder configured to decode the encoded video data;
a microprocessor comprising a video decoder configured to decode the encoded video data; or
a wireless handset comprising a video decoder configured to decode pictures using the encoded video data and a display configured to display the decoded pictures.

20. The device of claim 13, wherein the one or more processors are configured to decode the encoded video data, the device further comprising a display configured to display the decoded video data.

21. A device for processing an MPEG-2 transport stream for carriage of multi-layer video data, the device comprising:
a data storage medium configured to store encoded video data, and
one or more processors configured to:
signal, in a first descriptor for a program comprising one or more elementary streams comprising the encoded video data, a plurality of profile, tier, level (PTL) syntax element sets, each respective PTL syntax element set of the plurality of PTL syntax element sets comprising syntax elements specifying respective PTL information; and
signal, in the first descriptor or a second descriptor for the program, a plurality of operation point syntax element sets, wherein:
the first descriptor and the second descriptor are in a program map table of the MPEG-2 transport stream,
each respective operation point syntax element set of the plurality of operation point syntax element sets specifies a respective operation point of the plurality of operation points, and
for each respective layer of the respective operation point, the respective operation point syntax element set includes a respective syntax element identifying a respective PTL syntax element set of the plurality of PTL syntax element sets specifying PTL information assigned to the respective layer of the respective operation point, the respective operation point having a plurality of layers.

22. The device of claim 21, wherein the one or more processors are configured such that, as part of signaling the plurality of PTL syntax element sets, the one or more processors:
for each respective PTL syntax element set of the plurality of PTL syntax element sets:
signal, in the respective PTL syntax element set, a respective profile syntax element specifying a profile to which a coded video sequence conforms;
signal, in the respective PTL syntax element set, a respective tier syntax element, the respective tier syntax element specifying a context for interpretation of a respective level indicator syntax element in the respective PTL syntax element set; and
signal, in the respective PTL syntax element set, the respective level indicator syntax element, the respective level indicator syntax element indicating a level to which the coded video sequence conforms.

23. The device of claim 21, wherein the one or more processors are configured to:
signal, in the first descriptor for the program, a syntax element indicating the number of PTL syntax element sets in the plurality of PTL syntax element sets.

24. The device of claim 21, wherein the one or more processors are configured to:
signal, in the first descriptor or the second descriptor, a syntax element indicating the number of operation point syntax element sets in the plurality of operation point syntax element sets.

25. The device of claim 21, wherein the one or more processors are configured such that, as part of signaling the plurality of operation point syntax element sets, the one or more processors:
for each respective operation point syntax element set of the plurality of operation point syntax element sets, signal the number of layers of the respective operation point specified by the respective operation point syntax element set.

26. The device of claim 21, wherein the one or more processors are configured such that, as part of signaling the plurality of operation point syntax element sets, the one or more processors:
for each respective operation point syntax element set of the plurality of operation point syntax element sets:
signal a respective first syntax element specifying a maximum temporal identifier of the respective operation point specified by the respective operation point syntax element set;
signal a respective second syntax element specifying an average bit rate of the respective operation point specified by the respective operation point syntax element set;
signal a respective third syntax element specifying a maximum bit rate of the respective operation point specified by the respective operation point syntax element set; and
signal a respective fourth syntax element specifying a maximum picture rate of a High Efficiency Video Coding (HEVC) layered video stream corresponding to the respective operation point specified by the respective operation point syntax element set.

27. The device of claim 21, wherein the device comprises at least one of:
an integrated circuit;
a microprocessor; or
a wireless handset.

28. A device for processing an MPEG-2 transport stream for carriage of multi-layer video data, the device comprising:
means for obtaining, from a first descriptor for a program comprising one or more elementary streams, a plurality of profile, tier, level (PTL) syntax element sets, each respective PTL syntax element set of the plurality of PTL syntax element sets comprising syntax elements specifying respective PTL information;
means for obtaining, from the first descriptor or a second descriptor for the program, a plurality of operation point syntax element sets, wherein the first descriptor and the second descriptor are in a program map table of the MPEG-2 transport stream and each respective operation point syntax element set of the plurality of operation point syntax element sets specifies a respective operation point of a plurality of operation points; and
for each respective operation point syntax element set of the plurality of operation point syntax element sets, means for determining, for each respective layer of the respective operation point specified by the respective operation point syntax element set, based on a respective syntax element for the respective layer, which of the PTL syntax element sets specifies the PTL information assigned to the respective layer of the respective operation point, the respective syntax element being in the respective operation point syntax element set, the respective operation point having a plurality of layers.

29. A device for processing an MPEG-2 transport stream for carriage of multi-layer video data, the device comprising:

means for signaling, in a first descriptor for a program comprising one or more elementary streams, a plurality of profile, tier, level (PTL) syntax element sets, each respective PTL syntax element set of the plurality of PTL syntax element sets comprising syntax elements specifying respective PTL information; and means for signaling, in the first descriptor or a second descriptor for the program, a plurality of operation point syntax element sets, wherein:

the first descriptor and the second descriptor are in a program map table of the MPEG-2 transport stream, each respective operation point syntax element set of the plurality of operation point syntax element sets specifies a respective operation point of the plurality of operation points, and for each respective layer of the respective operation point, the respective operation point syntax element set includes a respective syntax element identifying a respective PTL syntax element set of the plurality of PTL syntax element sets specifying PTL information assigned to the respective layer of the respective operation point, the respective operation point having a plurality of layers.

30. A computer-readable data storage medium having instructions stored thereon that, when executed, cause one or more processors of a video processing device to:

obtain, from a first descriptor for a program comprising one or more elementary streams, a plurality of profile, tier, level (PTL) syntax element sets, each respective PTL syntax element set of the plurality of PTL syntax element sets comprising syntax elements specifying respective PTL information;

obtain, from the first descriptor or a second descriptor for the program, a plurality of operation point syntax element sets, wherein the first descriptor and the second descriptor are in a program map table of an MPEG-2 transport stream and each respective operation point syntax element set of the plurality of operation point syntax element sets specifies a respective operation point of a plurality of operation points; and for each respective operation point syntax element set of the plurality of operation point syntax element sets, determine, for each respective layer of the respective operation point specified by the respective operation point syntax element set, based on a respective syntax element for the respective layer, which of the PTL syntax element sets specifies the PTL information assigned to the respective layer of the respective operation point, the respective syntax element being in the respective operation point syntax element set, the respective operation point having a plurality of layers.

31. A computer-readable data storage medium having instructions stored thereon that, when executed, cause one or more processors of a video processing device to:

signal, in a first descriptor for a program comprising one or more elementary streams, a plurality of profile, tier, level (PTL) syntax element sets, each respective PTL syntax element set of the plurality of PTL syntax element sets comprising syntax elements specifying respective PTL information; and signal, in the first descriptor or a second descriptor for the program, a plurality of operation point syntax element sets, wherein:

the first descriptor and the second descriptor are in a program map table of an MPEG-2 transport stream, each respective operation point syntax element set of the plurality of operation point syntax element sets specifies a respective operation point of the plurality of operation points, and for each respective layer of the respective operation point, the respective operation point syntax element set includes a respective syntax element identifying a respective PTL syntax element set of the plurality of PTL syntax element sets specifying PTL information assigned to the respective layer of the respective operation point, the respective operation point having a plurality of layers.

* * * * *